United States Patent
Abe et al.

(10) Patent No.: US 7,701,491 B2
(45) Date of Patent: Apr. 20, 2010

(54) IMAGE PICKUP DEVICE WITH ZOOM FUNCTION

(75) Inventors: Yoshinori Abe, Akishima (JP); Kazunori Yanagi, Akishima (JP); Keiichi Imamura, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 561 days.

(21) Appl. No.: 11/339,274

(22) Filed: Jan. 25, 2006

(65) Prior Publication Data

US 2006/0171703 A1    Aug. 3, 2006

(30) Foreign Application Priority Data

Jan. 31, 2005    (JP) .............................. 2005-023015

(51) Int. Cl.
*H04N 5/262* (2006.01)

(52) U.S. Cl. ................................... 348/240.2

(58) Field of Classification Search ............ 348/240.99, 348/240.2, 240.3, 240.1; 396/60, 85
See application file for complete search history.

(56) References Cited

U.S. PATENT DOCUMENTS

| | | | | |
|---|---|---|---|---|
| 5,097,279 A | * | 3/1992 | Sakamoto et al. | 396/60 |
| 5,172,234 A | * | 12/1992 | Arita et al. | 348/240.2 |
| 6,091,902 A | * | 7/2000 | Komatsuzaki et al. | 396/60 |
| 6,166,765 A | * | 12/2000 | Toyofuku | 348/220.1 |
| 6,507,704 B2 | * | 1/2003 | Enomoto | 396/60 |
| 6,750,903 B1 | * | 6/2004 | Miyatake et al. | 348/218.1 |
| 6,853,401 B2 | * | 2/2005 | Fujii et al. | 348/223.1 |
| 7,092,028 B2 | * | 8/2006 | Akutsu | 348/345 |
| 7,110,185 B2 | * | 9/2006 | Saori | 359/666 |
| 7,317,479 B2 | * | 1/2008 | Cazier et al. | 348/240.99 |

(Continued)

FOREIGN PATENT DOCUMENTS

CN    1450789 A    10/2003

(Continued)

OTHER PUBLICATIONS

Chinese Office Action (and English translation thereof) dated Jun. 6, 2008, issued in counterpart Chinese Application No. 200680000418.6.

(Continued)

*Primary Examiner*—Jason Chan
*Assistant Examiner*—Gary C Vieaux
(74) *Attorney, Agent, or Firm*—Frishauf, Holtz, Goodman & Chick, P.C.

(57) ABSTRACT

When a continuous-zoom-photographing mode is selected, a through image of a subject and first and second continuous-zoom-photographing frames are produced on an image-display section. When a user operates a cross key, recorded information about a trimming position of each of the first and second continuous-zoom-photographing frames is updated according to the cross-key operation, and the first and second continuous-zoom-photographing frames are produced at the updated trimming position recorded after the update. When a shutter button is operated, still-image photographing is started and obtained image data is stored in a buffer memory. On the basis of the obtained image data, image data is generated for each of the first and second continuous-zoom-photographing frames through trimming processing and stored in the buffer memory. The obtained image data and the generated image data are stored in a flash memory.

26 Claims, 13 Drawing Sheets

U.S. PATENT DOCUMENTS

| | | | |
|---|---|---|---|
| 7,358,988 B1* | 4/2008 | Konishi et al. | 348/222.1 |
| 2001/0010561 A1 | 8/2001 | Nagai | |
| 2001/0022626 A1 | 9/2001 | Nozaki | |
| 2003/0169343 A1 | 9/2003 | Kagaya et al. | |
| 2003/0193602 A1* | 10/2003 | Satoh et al. | 348/333.12 |
| 2004/0017481 A1 | 1/2004 | Takasumi et al. | |
| 2004/0252223 A1 | 12/2004 | Masuno et al. | |
| 2005/0174362 A1* | 8/2005 | Lee et al. | 345/660 |
| 2005/0219386 A1* | 10/2005 | Stavely et al. | 348/240.3 |
| 2005/0220349 A1 | 10/2005 | Furuya et al. | |

FOREIGN PATENT DOCUMENTS

| | | | |
|---|---|---|---|
| EP | 1 496 471 A1 | | 1/2005 |
| JP | 64-68074 A | | 3/1989 |
| JP | 04-326262 A | | 11/1992 |
| JP | 11-098405 A | | 4/1999 |
| JP | 2000-069345 A | | 3/2000 |
| JP | 2001-157159 A | | 6/2001 |
| JP | 2001-203926 A | | 7/2001 |
| JP | 2002223413 A | * | 8/2002 |
| JP | 2003-244631 A | | 8/2003 |
| JP | 2003-259296 A | | 9/2003 |
| JP | 2004135029 A | * | 4/2004 |
| JP | 2004-172655 A | | 6/2004 |

OTHER PUBLICATIONS

International Search Report dated Jul. 3, 2008, issued in counterpart International Application No. PCT/JP2006/301937.

Japanese Office Action dated Mar. 19, 2009 (3 pages), and English translation thereof (3 pages), issued in counterpart Japanese Application Serial No. 2005-023015.

Japanese Office Action dated Jun. 12, 2009 (6 pages), and English translation thereof (7 pages), issued in counterpart Japanese patent Application Serial No. 2005-023015.

* cited by examiner

FIG. 2

| IMAGE SIZE | SIZE AND ZOOM MAGNIFICATION OF TRIMMING IMAGE | |
|---|---|---|
| 3072 × 2304 | 2048 × 1536 (1.5 ×) | 1600 × 1200 (1.92 ×) |
| 2560 × 1920 | 1600 × 1200 (1.6 ×) | 1280 × 960 (2.0 ×) |
| 2048 × 1536 | 1280 × 960 (1.6 ×) | 1024 × 768 (2.0 ×) |
| 1600 × 1200 | 1024 × 768 (1.56 ×) | 640 × 480 (2.5 ×) |

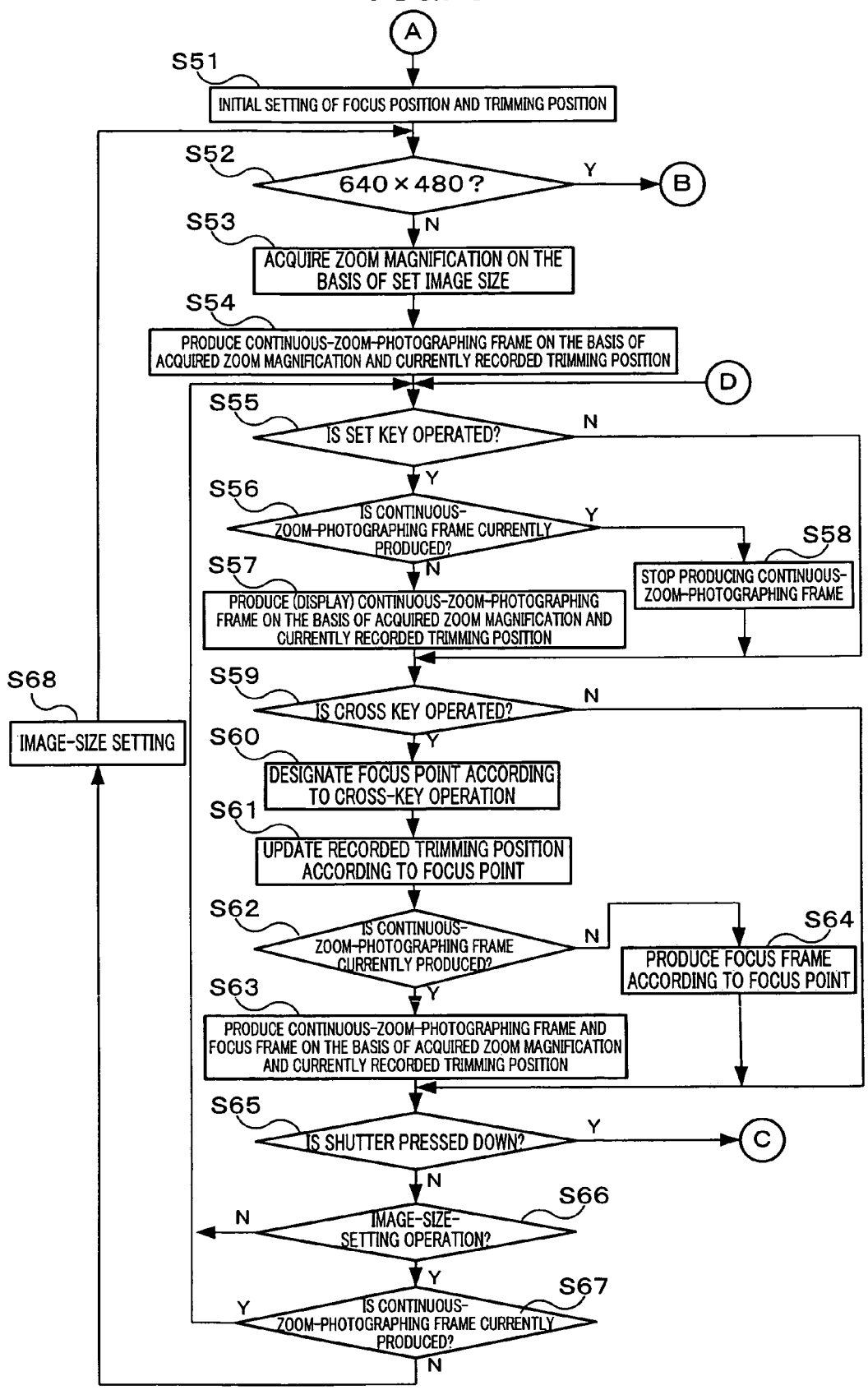

IMAGE PICKUP DEVICE WITH ZOOM FUNCTION

CROSS-REFERENCE TO RELATED APPLICATION

This application is based upon and claims the benefit of priority from the prior Japanese Patent Application No. 2005-023015, filed Jan. 31, 2005, the entire contents of which is incorporated herein by reference.

BACKGROUND OF THE INVENTION

1. Field of the Invention

The present invention relates to an image pickup device and an image pickup method with a zoom function, where the image pickup device and the image pickup method can be used for a digital camera.

2. Description of the Related Art

In the past, an image pickup device, such as a digital camera has an optical-zooming function so that the image pickup device can zoom in on a subject and photograph the subject. Further, there have been proposed digital cameras that can bracket a focal length and photograph a subject.

Japanese Laid-Open Patent Application No. P2000-69345 discloses a camera with a zoom function. More specifically, if a release key is not pressed down by two stages and a wide-key top and/or a telescopic-key top of a zoom key is pressed down when the camera with the zoom function is in an automatic-zoom-photographing mode, photographing operations and recording operations are repetitively performed while a focal length is changed step by step. Subsequently, at least two photographed images with different viewing angles can be obtained.

SUMMARY OF THE INVENTION

In accordance with an aspect of the invention, there is provided an image pickup device comprising, an image pickup means for imaging a subject; a photograph control means for controlling the image pickup means that performs still-image photographing for the subject; a generation means for generating trimmed-image data on the basis of photographed-image data obtained by the photograph control means; and a record control means for recording the photographed-image data obtained by the photograph control means and the trimmed-image data obtained by the generation means in record means.

In accordance with another aspect of the invention, there is provided an image pickup method comprising the steps of, a photographing step of picking up a subject and obtaining photographed-image data; a generating step of generating trimmed-image data on the basis of the photographed-image data obtained by the photographing step; and a recording step of recording the photographed-image data obtained by the photographing step and the trimmed-image data obtained by the generating step onto recording medium.

In accordance with still another aspect of the invention, there is provided a program enabling a computer to execute each processing, including, a picking up processing for imaging a subject; a photograph control processing for controlling the image pickup processing that performs still-image photographing for the subject; a generation processing for generating trimmed-image data on the basis of photographed-image data obtained by the photograph control processing; and a record control processing for recording the photographed-image data obtained by the photograph control processing and the trimmed-image data obtained by the generation processing in recording medium.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 2 shows a trimming-size table stored in a memory 9;

FIG. 9 is a flowchart illustrating operations of a digital camera according to the second embodiment of the present invention;

DETAILED DESCRIPTION OF THE PREFERRED EMBODIMENTS

Hereinafter, preferred embodiments of the present invention will be described in detail with reference to the attached drawings, where a digital camera is used in each of the embodiments.

A. First Embodiment

A-1. The Configuration of Digital Camera

Figure 1:
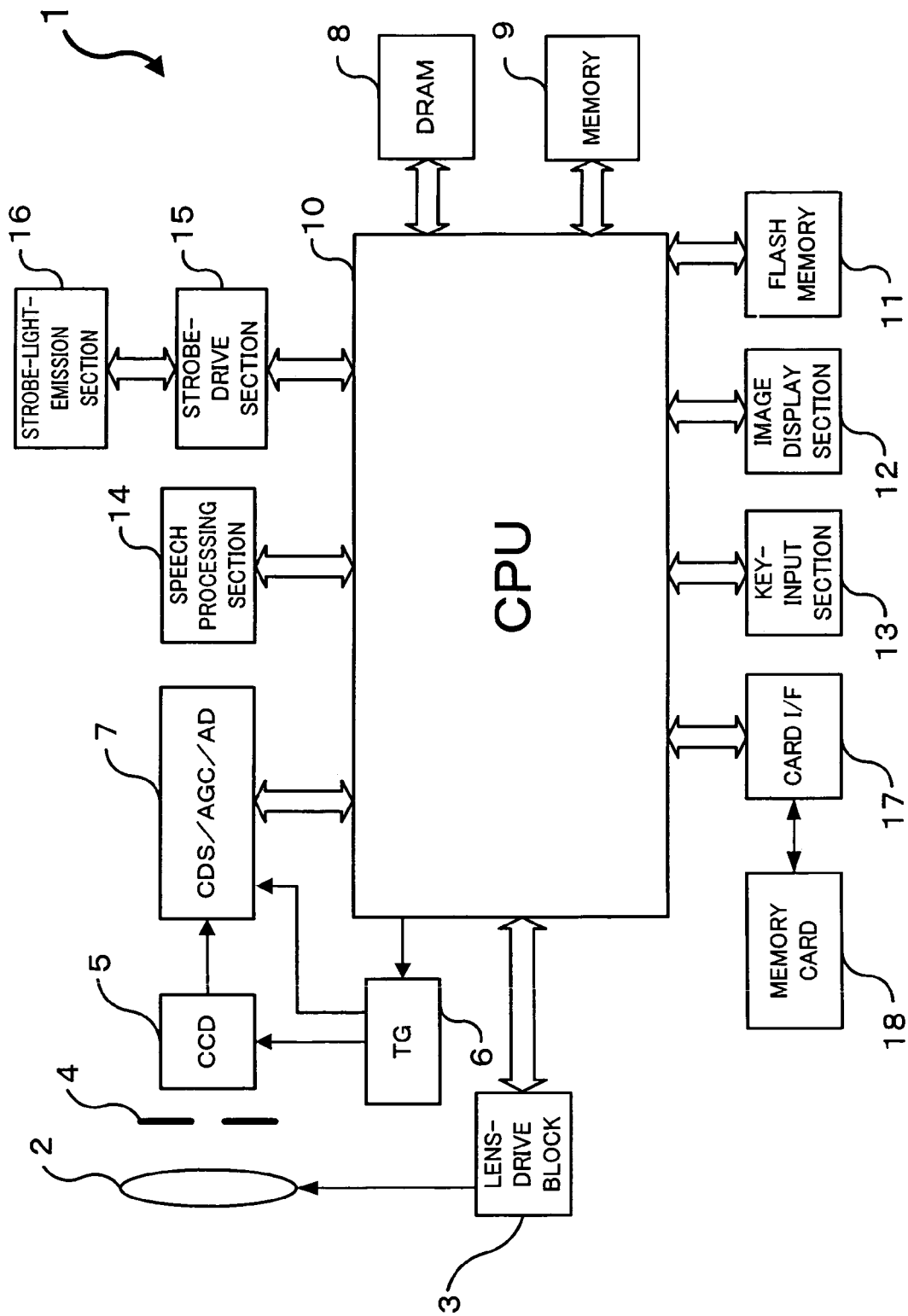
FIG. 1 is a block diagram of a digital camera according to the first embodiment of the present invention.

FIG. 1 is a block diagram schematically showing the electrical configuration of a digital camera 1 achieving an image pickup device of the present invention.

The digital camera 1 includes a photographic lens 2, a lens-drive block 3, a shutter/aperture 4, a charge-coupled device (CCD) 5, a timing generator (TG) 6, a unit circuit 7, a dynamic random access memory (DRAM) 8, a memory 9, a CPU 10, a flash memory 11, an image display section 12, a key-input section 13, a speech processing section 14, a strobe drive section 15, a strobe-light-emission section 16, and a card interface (I/F) 17. A memory card 18 inserted in a card slot (not shown) of a main body of the digital camera 1 in a removable manner is connected to the card I/F 17.

The lens-drive block 3 is connected to the photographic lens 2 including a focus lens and a zoom lens (that are not shown). The lens-drive block 3 includes a motor configured to drive the above-described focus lens in the optical-axis direction and a motor configured to drive the above-described zoom lens in the optical-axis direction. Further, the lens-drive block 3 includes a focus-motor driver and a zoom-motor driver that are configured to drive the focus motor and the zoom motor in the optical-axis direction, respectively, according to a control signal transmitted from the CPU 10.

The shutter/aperture 4 which includes an un-shown drive circuit in which the un-shown drive circuit operates the shutter/aperture according to a control signal transmitted from CPU 10. The shutter/aperture 4 functions, as an aperture and a shutter.

The aperture denotes a mechanism configured to control the amount of light entering through the photographic lens 2. The shutter denotes a mechanism configured to control the length of a time period over which the CCD 5 is irradiated with light. The time period over which the CCD 5 is irradiated with light changes according to the speed of opening and closing the shutter (the shutter speed). An exposure can be determined according to the aperture and the shutter speed.

The CCD 5 converts the light of a subject image projected via the photographic lens 2 and the shutter/aperture 4 into an electric signal and transmits the electric signal to the unit circuit 7 as an imaging signal. Further, the CCD 5 operates according to a timing signal with a predetermined frequency generated by the TG 6. The unit circuit 7 is connected to the TG 6.

The unit circuit 7 includes a correlated-double-sampling (CDS) circuit configured to perform correlated-double sampling for the imaging signal transmitted from the CCD 5 and maintain the imaging signal, an automatic gain control (AGC) circuit configured to perform automatic-gain control for the sampled imaging signal, and an analog-to-digital (A/D) converter configured to convert an analog imaging signal that had been subjected to the automatic-gain control into a digital signal. The imaging signal transmitted from the CCD 5 is transmitted to the CPU 10 via the unit circuit 7 as a digital signal.

The CPU 10 is a single-chip microcomputer which controls each section of digital camera 1 while having the function of performing image processing for image data transmitted from the unit circuit 7 (pixel interpolation, gamma correction, generation of a brightness-color-difference signal, white-balance processing, exposure correction, and so forth) and performing compression and/or decompression of image data (image-data compression and/or decompression according to the joint-photographic-experts-group (JPEG) system and/or the motion-picture-experts-group (MPEG) system).

The DRAM 8 is used as a working memory of CPU 10 as well as a buffer memory configured to temporarily store image data transmitted to the CPU 10 after imaging by CCD 5.

The flash memory 11 and the memory card 18 are recording mediums which store data on an image picked up by the CCD 5 for example. Further, in the first embodiment, writing (recording) of image data is performed only by using the flash memory 11. However, a user can select between recording image data on the flash memory 11 or recording image data on the memory card 18 by operating the key-input section 13. The flash memory 11 and the memory card 18 function as a record means of the present invention.

The image display section 12 includes a color liquid-crystal display (LCD) and its driving circuit. In photographing standby state, the image display section 12 displays a subject image picturized by the CCD 5 as a through image. When a recorded image is played back, the recorded image is read from the flash memory 11 and/or the memory card 18 that are provided for storing image data and decompressed so that the image display section 12 produces the decompressed recorded image. The image display section 12 corresponds to a display means of the present invention.

The key-input section 13 includes a plurality of operation keys including a shutter button, a continuous-zoom-photographing key, a cross key, a SET key, and so forth, and is configured to transmit the operation signal corresponding to a key operation performed by the user to the CPU 10. The key-input section 13 functions as an indication means, a selection means, a change means, a specification means, and a switch means of the present invention.

The speech processing section 14 includes an internal microphone, an amplifier, an A/D converter, a digital-to-analog (D/A) converter, an amplifier, an internal speaker, and so forth. When an image with speech is being filmed, speech transmitted to the internal microphone is converted into a digital signal and transmitted to the CPU 10. The CPU 10 stores the transmitted speech data sequentially into a buffer memory (the DRAM 8) and stores the speech data and image data picturized by the CCD 5 into the flash memory 11 and/or the memory card 18.

Further, when the image with speech is played back, the speech processing section 14 emits speech on the basis of speech data attached to each image-data item from the internal speaker.

A strobe-drive section 15 drives a strobe-light-emission section 16 according to a control signal transmitted from the CPU 10 so that a strobe of the strobe-light-emission section 16 flashes. The CPU 10 determines whether or not a scene to be photographed is dark by a signal transmitted from the CCD 5 or a metering circuit (not shown). When the CPU 10 determines that the scene to be photographed is dark and photographing shall be taken (when the shutter button is pressed down), the CPU 10 transmits a control signal to the strobe-drive section 15.

A-2. The Functions of Components of Digital Cameras

Next, the function of each of the components of the digital camera 1 according to the present invention will be described.

When the user operates the key-input section 13 so that the power of the digital camera 1 is turned on, the CPU 10 makes the CCD 5 start picturizing a subject image, performs image processing for data on the subject image picturized by the CCD 5, stores the image data in the buffer memory (the DRAM 8), and starts performing so-called through-image display so that the image corresponding to the stored image data is produced (Here, "produce" has the same meaning as "display".) on the image display section 12 (a display control means). At that time, a focus frame which indicates a focus point is also produced on the image display section 12.

After the through-image display is started, the CPU 10 determines whether or not the user performed the operations to set the size of the image corresponding to image data recorded by performing still-image photographing. If it is determined that the user performed the image-data-size-setting operations, the CPU 10 sets the image-data size set by the user (a setting means).

After performing the through-image display, the CPU 10 determines whether or not continuous-zoom-photographing mode is selected. By performing the above-described determination, the CPU 10 determines whether or not an operation signal is transmitted, where the operation signal corresponds to the user's operation of the continuous-zoom-photographing key of the key-input section 13. If the operation signal is transmitted, the CPU 10 determines that the continuous-zoom-photographing mode is selected.

When it is determined that the continuous-zoom-photographing mode is selected, the CPU 10 determines whether or not the currently set image size is a size of 680×480 dots (pixels) (a determination unit). If it is determined that the currently-set image size is the 680×480-dot (pixel) size, the CPU 10 returns to ordinary a still-image-photographing mode. This is because when trimming is performed for image data of the 680×480-dot (pixel) size, an obtained image becomes significantly small in size and has poor quality.

If the CPU 10 determines that the set image size is not the 680×480-dot (pixel) size, the CPU 10 acquires information about the zoom magnification of a continuous-zoom-photographing frame showing the range of an image trimmed from an image of the currently set size from a trimming-size table stored in memory 9 (a frame information acquisition means).

FIG. 2 shows the details on the trimming-size table stored in the memory 9.

As shown in FIG. 2, if the currently set image size is a size of 3072×2304 dots (pixels), the size of an image for trimming becomes a size of 2048×1536 dots (pixels) or 1600×1200 dots (pixels) and the zoom magnification of the continuous-zoom-photographing frame becomes 1.5× or 1.92×, respectively.

Further, when the set image size is a size of 2560×1920 dots (pixels), the size of an image for trimming becomes the 1600×1200-dot (pixel) size or the 1280×960-dot (pixel) size and the zoom magnification of the continuous-zoom-photographing frame becomes 1.6× or 2.0×, respectively.

Further, when the set image size is a size of 2048×1536 dots (pixels), the size of an image for trimming becomes the 1280×960-dot (pixel) size or the 1024×768-dot (pixel) size and the zoom magnification of the continuous-zoom-photographing frame becomes 1.6× or 2.0×, respectively.

Further, when the set image size is the 1600×1200-dot (pixel) size, the size of an image for trimming becomes the 1024×768 dot (pixel) size or the 640×480-dot (pixel) size and the zoom magnification of the continuous-zoom-photographing frame becomes 1.56× or 2.5×, respectively.

Here, the size and zoom magnification are determined for each of the large and small trimmed images corresponding to the size of an image that is being picked up so that two trimmed images are generated on the basis of data on the picturized image. The memory 9 functions as a correspondence-table-recording means of the present invention.

Further, after acquiring the zoom-magnification information of the continuous-zoom-photographing frame, the CPU 10 makes the image display section 12 produce the continuous-zoom-photographing frame on the basis of the zoom-magnification information acquired from the memory 9 and information about a trimming position (the position where the continuous-zoom-photographing frame is produced) recorded onto a trimming-position-recording area of the memory 9 (a display control means).

When the continuous-zoom-photographing frame is produced on the basis of the acquired zoom-magnification information, the viewing angle of the produced continuous-zoom-photographing frame corresponds to the zoom-magnification information acquired for the viewing angle of an image currently being picturized. For example, when the currently set image size is the 3072×2304-dot (pixel) size, the continuous-zoom-photographing frame is produced so that the viewing angle thereof corresponds to the zoom magnification of 1.5× or 1.92× with reference to the viewing angle of an image being picturized.

Further, when the continuous-zoom-photographing frame is produced on the basis of the trimming-position information recorded onto the trimming-position-recording area of the memory 9, the continuous-zoom-photographing frame is produced at a display position on the image display section 12, where the display position corresponds to the trimming-position information recorded onto the trimming-position-recording area. At that time, first, trimming-position information used for producing the continuous-zoom-photographing frame at the center part of the image display section 12 is recorded onto the trimming-position-recording area. However, when the trimming position is changed, as will be described later, information about the changed trimming position is recorded onto the trimming-position-recording area. Further, at that time, a focus frame is produced on the center part of the continuous-zoom-photographing frame. This is because the center part of the continuous-zoom-photographing frame is brought into focus automatically by performing autofocus (AF) processing that will be described later.

Figure 3:
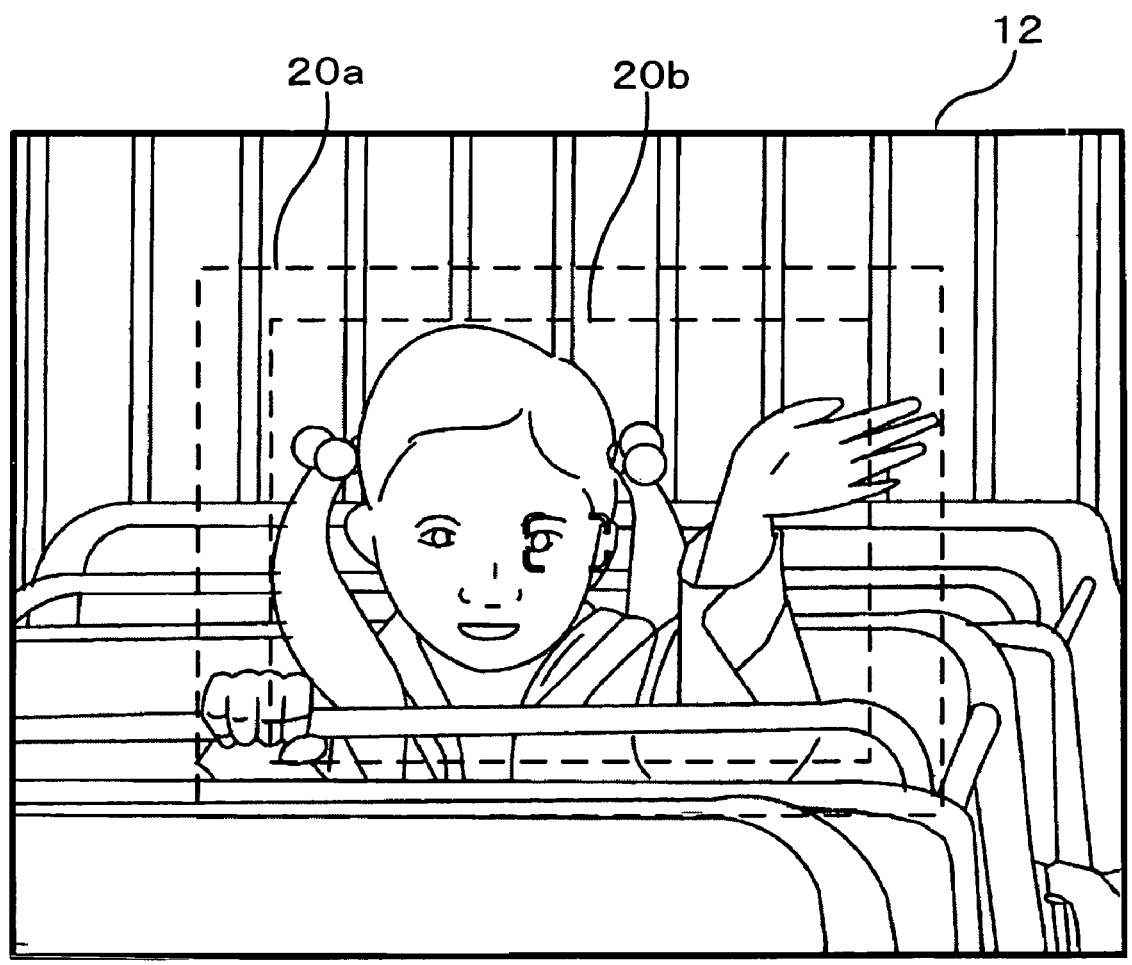
FIG. 3 shows a continuous-zoom-photographing frame 20 produced on an image display section 12.

FIG. 3 shows the continuous-zoom-photographing frame produced on the image display section 12 when the trimming position is not yet changed.

As shown in FIG. 3, an image of a girl (the subject), where the image is picturized by the CCD 5, a continuous-zoom-photographing frame 20*a*, and a continuous-zoom-photographing frame 20*b*, is produced. The continuous-zoom-photographing frames 20*a* and 20*b* are produced at the center of a picked-up image (a through image). Further, for example, if a set image size is the 3072×2304-dot (pixel) size, the continuous-zoom-photographing frame 20*a* is produced so that the viewing angle thereof corresponds to the zoom magnification of 1.5× and the continuous-zoom-photographing frame 20*b* is produced so that the viewing angle thereof corresponds to the zoom magnification of 1.92×.

Further, the CPU 10 determines whether or not the user operated the SET key. The determination is made according to whether or not the operation signal corresponding to the operation of the SET key was transmitted from the key-input section 13. If the operation signal was transmitted, the CPU 10 determines that the user operated the SET key.

After determining that the user operated the SET key, the CPU 10 determines whether or not the continuous-zoom-photographing frame 20 (hereinafter, the continuous-zoom-photographing frame 20*a* and the continuous-zoom-photographing frame 20*b* are collectively referred to as the continuous-zoom-photographing frame 20) is currently produced. If it is determined that the continuous-zoom-photographing frame 20 is currently produced, the CPU 10 stops producing the continuous-zoom-photographing frame 20. If it is determined that the continuous-zoom-photographing frame 20 is not currently produced, the CPU 10 produces the continuous-zoom-photographing frame 20 on the basis of the zoom-magnification information acquired from the memory 9 and the trimming-position information recorded onto the trimming-position-recording area of the memory 9.

Further, the CPU 10 determines whether or not the cross key was operated while the continuous-zoom-photographing frame 20 is produced. The above-described determination is made according to whether or not an operation signal is transmitted from the key-input section 13, where the operation signal corresponds to the cross-key operation. If it is determined that the operation signal was transmitted, the CPU 10 determines that the cross key was operated.

If it is determined that the cross key was operated while the continuous-zoom-photographing frame 20 is produced, the CPU 10 calculates a new trimming position according to the cross-key operation performed by the user, records information about the new trimming position onto the trimming-position-recording area (last memory), and makes the image display section 12 produce the continuous-zoom-photographing frame 20 at the display position corresponding to the recorded trimming-position information. Since the trimming-position information is recorded, when photographing is performed in the continuous-zoom-photographing mode, the continuous-zoom-photographing frame 20 is produced again at the position where the continuous-zoom-photographing frame 20 was produced last time by selecting the continuous-zoom-photographing mode. The above-described function adapted to record the trimming-position information corresponds to a trimming-position-record-control unit of the present invention.

Figure 4:
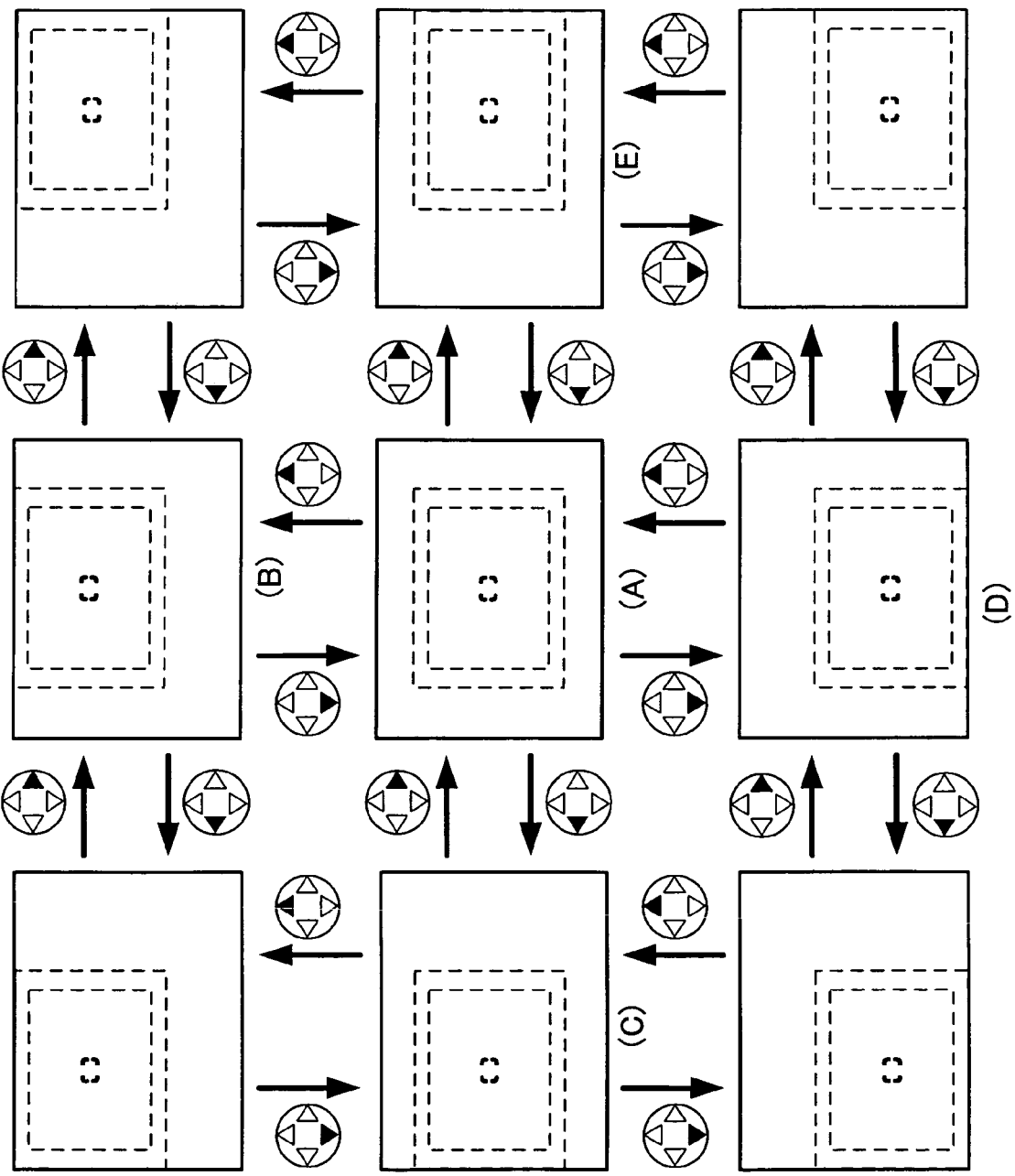
FIGS. 4 shows the state where the display positions of the continuous-zoom-photographing frame 20 produced on the image display section 12 is changed.

FIG. 4 shows the display positions where the continuous-zoom-photographing frame 20 is produced, where the display position is updated according to the cross-key operation performed by the user.

For example, if the user keeps pressing down a predetermined part designated by the symbol "↑" of the cross key while an image is shown, as in display position (A) (when the continuous-zoom-photographing frame 20 is produced at the center), the display position of the continuous-zoom-photographing frame 20 is gradually moved upward. When the upper edge of the continuous-zoom-photographing frame 20 reaches the upper end of the image-display section 12, as shown in display position (B), the movement is stopped. That is to say, the continuous-zoom-photographing frame 20 is not shown at a position higher than the upper end of the image-display section 20. If the user keeps pressing down a predetermined part designated by the symbol "←" of the cross key when an image is shown, as in display position (A), the display position of the continuous-zoom-photographing frame 20 is gradually moved to the left. When the left edge of the continuous-zoom-photographing frame 20 reaches the left end of the image display section 12, as shown in display position (C), the movement is stopped. That is to say, the continuous-zoom-photographing frame 20 is not shown to the left of the left end of the image-display section 20.

Further, on the contrary, when the user keeps pressing down a predetermined part designated by the symbol "↓" of the cross key when an image is shown, as in display position (A), the display position of the continuous-zoom-photographing frame 20 is gradually moved downward. When the lower edge of the continuous-zoom-photographing frame 20 reaches the lower end of the image-display section 12, as shown in display position (D), the movement is stopped. Further, if the user keeps pressing down a predetermined part designated by the symbol "→" of the cross key when an image is shown, as in display position (A), the display position of the continuous-zoom-photographing frame 20 is gradually moved to the right. When the right edge of the continuous-zoom-photographing frame 20 reaches the right end of the image display section 12, as shown in display position (B), the movement is stopped.

Thus, the CPU 10 updates the recorded trimming-position information according to the cross-key operation performed by the user and makes the image display section 12 produce the continuous-zoom-photographing frame 20. Subsequently, the user can move the display position of the continuous-zoom-photographing frame 20 to a desired position. Thus, the user can fit the continuous-zoom-photographing frame 20 into an area the user wants to trim. Further, the continuous-zoom-photographing frame 20a and the continuous-zoom-photographing frame 20b move as a single piece according to the cross-key operation.

Further, the CPU 10 determines whether or not the shutter button is pressed down. The above-described determination is made according to whether or not the operation signal corresponding to the pressing down of the shutter button of the key-input section 13 is transmitted.

If it is determined that the shutter button is pressed down, the CPU 10 performs the AF processing. At that time, the center part of the continuous-zoom-photographing frame 20 is brought into focus automatically (an autofocus control means). That is to say, a focus lens is driven so that the center part of the continuous-zoom-photographing frame 20 comes into focus. This is because it can be expected that an image that falls within the continuous-zoom-photographing frame 20 will correspond to a subject the user wants to photograph.

After performing the AF processing, the CPU 10 starts the still-image photographing process (a photograph-control means) and performs image processing for the image data obtained by the still-image photographing process (photographed-image data), that is, thinning-out processing or the like, so as to become an image of the currently set size, and stores the image data into the buffer memory.

Further, the CPU 10 reads the trimming-position information stored In the memory 9 and the image-for-trimming-size information corresponding to the currently set image size (a size-acquisition means and a trimming-position-acquisition means), selects image data that falls within the area corresponding to the read trimming-position information and trimmed-image-size information from among photographed-image data stored in the buffer memory and copies the selected image data into the buffer memory (hereinafter, the copied image data is referred to as trimmed-image data). Further, the CPU 10 may perform pixel-interpolation processing for the copied trimmed-image data, so as to obtain an image of the currently set size, and store the trimmed-image data into the buffer memory. The above-described function of generating the trimmed-image data from the photographed-image data corresponds to a generation unit of the present invention.

Further, the CPU 10 makes the image display section 12 produce the photographed-image data and the trimmed-image data corresponding to two images that are stored in the buffer memory as a review-display image (a photograph-review-display-control means). For producing the above-described review-display image, the three images corresponding to the recorded image data may be produced one by one at predetermined time periods. Further, the produced image data may be changed at the time where the user operates the key-input section 13.

Then, the CPU 10 compresses the photographed-image data and trimmed-image data that are stored in the buffer memory and stores the compressed data into the flash memory 11 (a record control means).

The memory 9 stores programs required of the CPU 10 to control the sections of the digital camera 1 and data (the trimming-size table or the like) required to control the sections. The CPU 10 functions as the image pickup device of the present invention by performing processing according to the above-described programs. The memory 9 functions as a record unit of the present invention.

The digital camera 1 of the first embodiment is set so that the digital camera can zoom in on the subject by an optical system even though the digital camera 1 cannot perform electronic zooming when the continuous-zoom-photographing mode is selected.

A-3. Operations of Digital Camera 1

Figure 5:
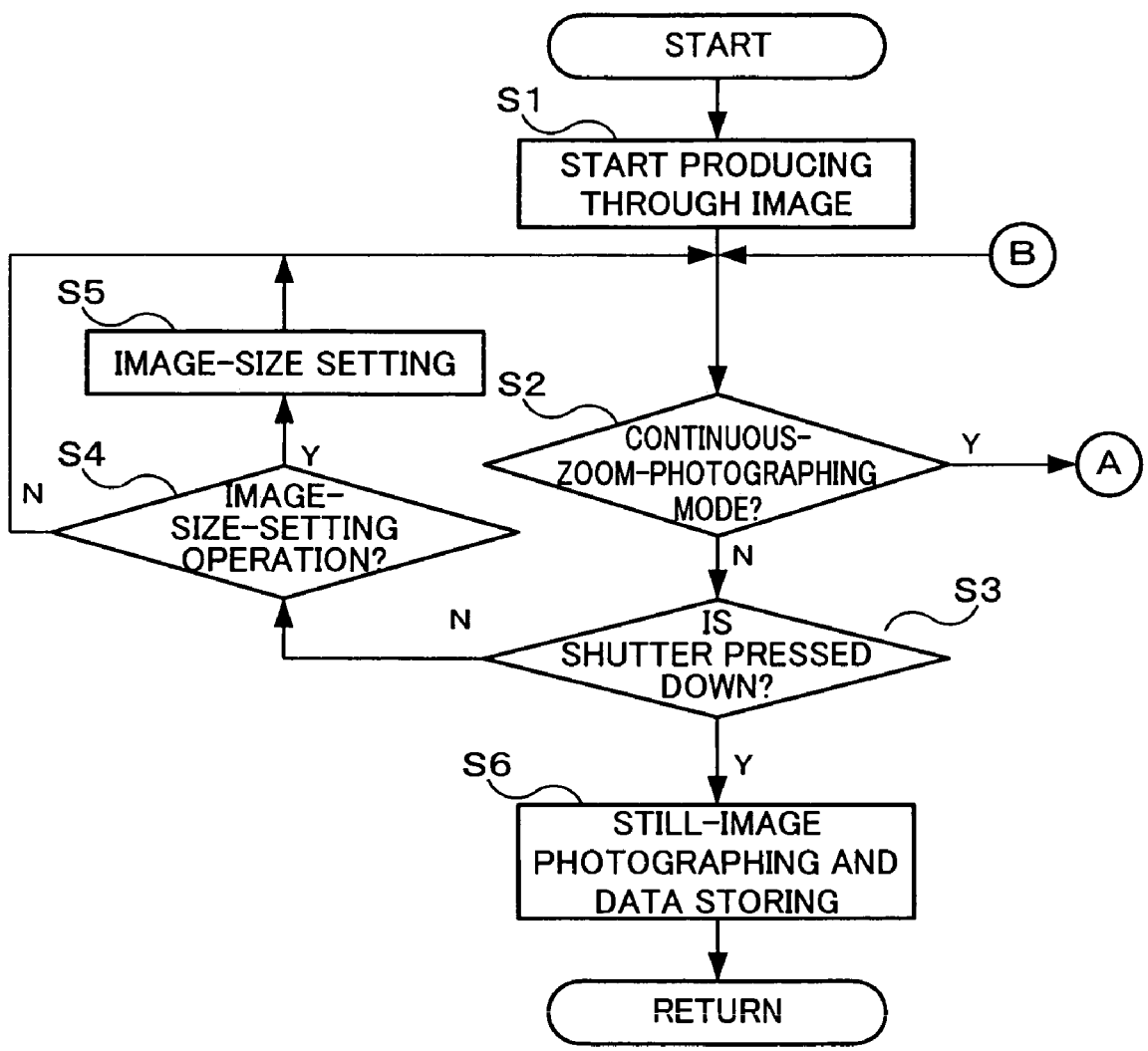
FIG. 5 is a flowchart illustrating operations of the digital camera according to the first embodiment.

Operations of the digital camera 1 of the first embodiment will be described with reference to flowcharts shown in FIGS. 5 to 7.

First, the user operates the key-input section 13 so that the power of the digital camera 1 is turned on. Then, the CCD 5 starts picturizing an image of the subject and the image display section 12 produces (Here, "produce" has the same meaning as "display". Hereafter, although "produce" is used in the specification, it is meant as "display".) the picturized subject image. That is to say, a through-image display is started (step S1). At that time, the focus frame showing the focus point is also produced on the image display section 12.

Next, it is determined whether or not the continuous-zoom-photographing mode is selected by the user (step S2). The above-described determination is made according to whether or not an operation signal is transmitted from the key-input section 13 to the CPU 10, where the operation signal corresponds to the continuous-zoom-photographing-key operation.

If it is determined that the continuous-zoom-photographing mode is not selected at step S2, the flow proceeds to step S3 where it is determined whether or not the shutter button is pressed down.

If it is determined that the shutter button is not pressed down at step S3, it is determined whether or not image-size-setting operations are performed by the user. The above-described determination is made according to whether or not an operation signal is transmitted from the key-input section 13, where the operation signal corresponds to the image-size-setting operations. If the operation signal is transmitted, it is determined that the setting operations are performed.

If it is determined that the image-size-setting operations are performed at step S4, the flow proceeds to step S5 so that the image-size setting is performed according to the setting operations. Then, the flow returns to step S2. If it is determined that the image-size-setting operations are not performed at step S4, the flow returns to step S2.

On the other hand, if it is determined that the shutter button is pressed down at step S3, the flow proceeds to step S6 so that the AF processing and the still-image-photographing processing are performed and image data obtained thereby is stored in the flash memory 11. At that time, if settings are made so that the review display is performed, image data obtained by performing the photographing processing is produced on the image display section 12 as a review-display image before the image data obtained by the still-image-photographing processing is stored in the flash memory 11.

Then, the image data is stored in the flash memory 11 and the flow returns to step S1.

Figure 6:
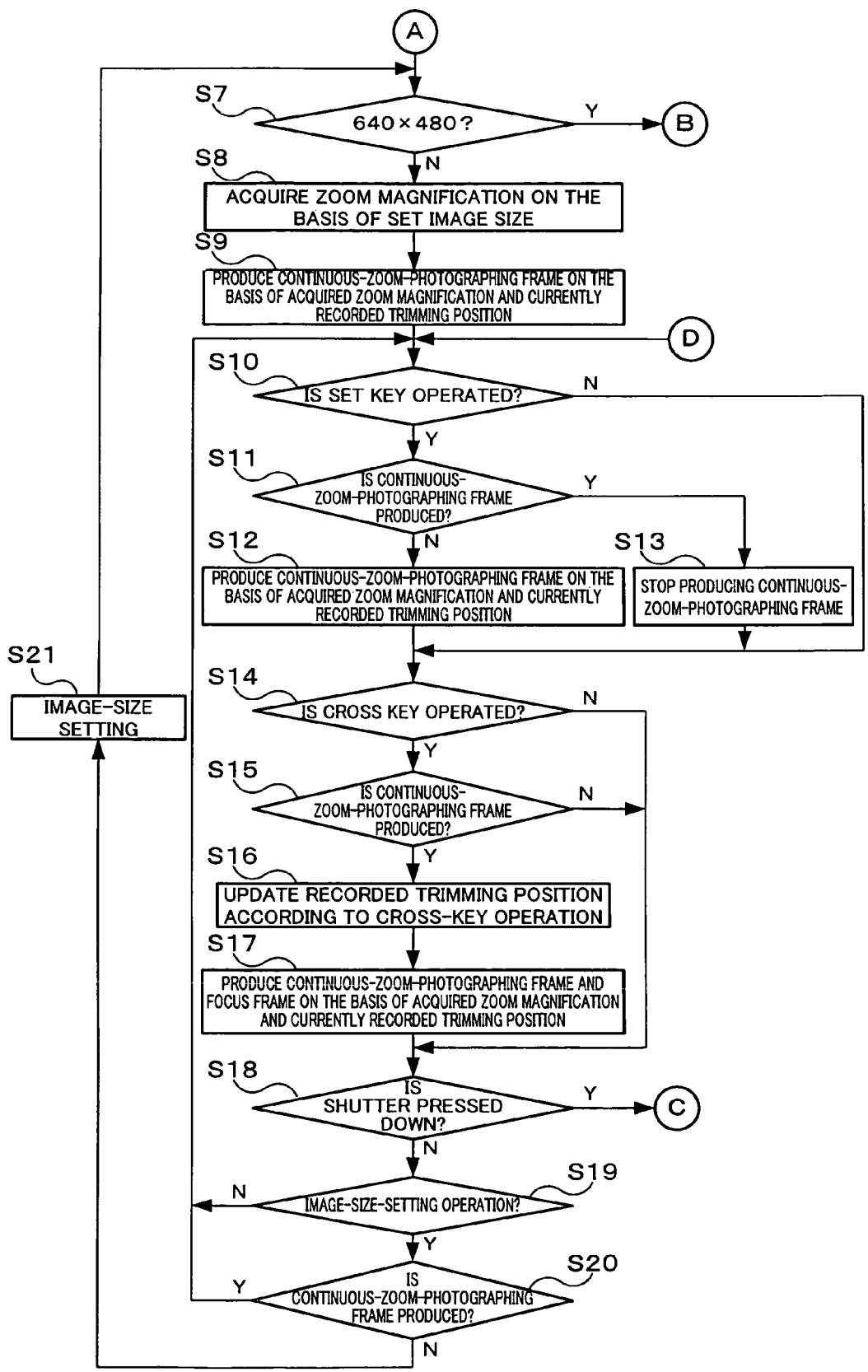
FIG. 6 is a flowchart illustrating other operations of the digital camera according to the first embodiment.

On the other hand, if it is determined that the continuous-zoom-photographing mode is selected at step S2, the flow proceeds to step S7 shown in FIG. 6 so as to determine whether or not the currently set image size corresponds to 680×480 dots (pixels). If it is determined that the currently set image size corresponds to 680×480 dots (pixels), the digital camera 1 returns to the ordinary still-image-photographing mode, that is, step S2. If it is determined that the currently set image size does not correspond to 680×480 dots (pixels), the flow proceeds to step S8. This is because when trimming is performed while the set image size corresponds to 680×480 dots (pixels), an obtained image becomes significantly small in size and has poor quality.

When the flow proceeds to step S8, information about the zoom magnification of the continuous-zoom-photographing frame 20 produced on the image display section 12 is acquired from the triming-size table stored in the memory 9 on the basis of the currently set image size. Here, when the currently set image size corresponds to 3072×2304 dots (pixels), the acquired zoom magnification of the continuous-zoom-photographing frame 20 can be 1.5× and 1.92×.

Next, at step S9, the continuous-zoom-photographing frame 20 is produced on the image display section 12 on the basis of the acquired information about the zoom magnification of the continuous-zoom-photographing frame 20 and the trimming-position information recorded onto the trimming-position-recording area of the memory 9. First, trimming-position information used for producing the continuous-zoom-photographing frame at the center part of the image-display section 12 is recorded onto the trimming-position-recording area. However, when the trimming position is changed, as will be described later, information about the changed trimming position is recorded onto the trimming-position-recording area.

FIG. 3 shows the continuous-zoom-photographing frame 20 produced on the image display section 12 when the trimming position is not yet changed. Here, since the acquired zoom-magnification information shows that the zoom magnification of the continuous-zoom-photographing frame 20 is 1.5× and 1.92×, the continuous-zoom-photographing frame 20a shown in FIG. 3 is produced so that the size thereof corresponds to the viewing angle which makes the zoom magnification 1.5× for the viewing angle of an image that is being picturized. Further, the continuous-zoom-photographing frame 20b is produced so that the size thereof corresponds to the viewing angle which makes the zoom magnification 1.92× for the viewing angle of the image that is being picturized.

After the continuous-zoom-photographing frame 20 is produced on the image display section 12, it is determined whether or not the user operates the SET key at step S10. The above-described determination is made by determining whether or not the operation signal corresponding to the SET-key operation is transmitted from the key-input section 13.

If it is determined that the SET key is operated at step S10, it is determined whether or not the continuous-zoom-photographing frame 20 is currently produced at step S11.

If it is determined that the continuous-zoom-photographing frame 20 is not produced at step S11, the flow proceeds to step S12 so that the continuous-zoom-photographing frame 20 is produced on the basis of the acquired information about the zoom-magnification of the continuous-zoom-photographing frame 20 and the trimming-position information recorded onto the trimming-position-recording area, and then proceeds to step S14. If it is determined that the continuous-zoom-photographing frame 20 is produced at step S11, the flow proceeds to step S13 so that the production of the continuous-zoom-photographing frame 20 is stopped, and then proceeds to step S14.

On the other hand, if it is determined that the SET key is not operated at step S10, the flow proceeds to step S14.

When the flow proceeds to step S14, it is determined whether or not the user operates the cross key. The above-described determination is made by determining whether or not the operation signal corresponding to the cross-key operation is transmitted from the key-input section 13.

If it is determined that the cross key is operated at step S14, the flow proceeds to step S15 so that it is determined whether or not the continuous-zoom-photographing frame 20 is currently produced. If it is determined that the continuous-zoom-photographing frame 20 is produced, the flow proceeds to step S16 so that a new trimming position is calculated according to the cross-key operation and information about the calculated trimming position is recorded (last memory). That is to say, the trimming-position information recorded onto the trimming-position-record area is updated.

Next, the continuous-zoom-photographing frame 20 and the focus frame are produced on the image display section 12 on the basis of the acquired information about the zoom-magnification of the continuous-zoom-photographing frame 20 and the new trimming-position information recorded onto the trimming-position-record area, and then proceeds to step S18.

On the other hand, if it is determined that the cross key is not operated at step S14, and if the continuous-zoom-photographing frame 20 is not produced at step S15, the flow proceeds to step S18.

When the flow proceeds to step S18, it is determined whether or not the user presses down the shutter button. The above-described determination is made according to whether or not the operation signal corresponding to the pressed-down shutter button is transmitted from the key-input section 13.

If it is determined that the shutter button is not pressed down at step S18, the flow proceeds to step S19 so that it is determined whether or not the user performs image-size-setting operations.

If it is determined that the image-size-setting operations are performed at step S19, the flow proceeds to step S20 so that it is determined whether or not the continuous-zoom-photographing frame 20 is currently produced.

If it is determined that the continuous-zoom-photographing frame 20 is not produced at step S20, the flow proceeds to step S21 so that the image-size setting is performed according to the setting operations performed by the user. Then, the flow returns to step S7.

Figure 7:
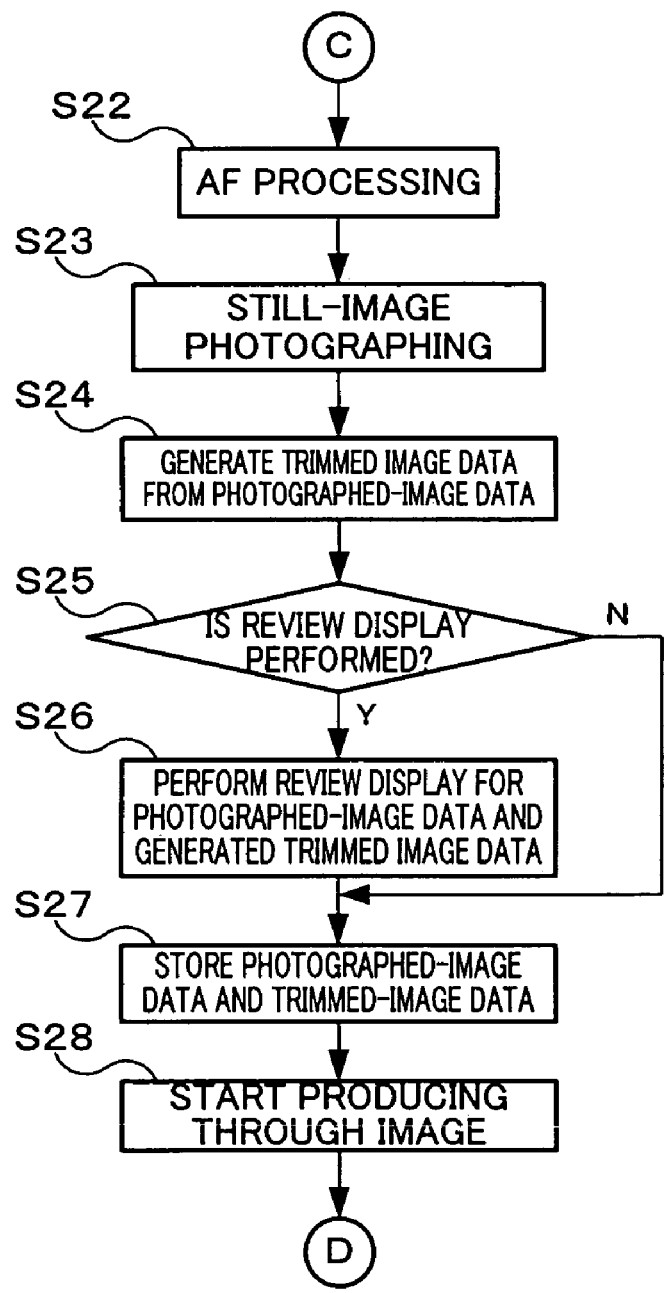
FIG. 7 is a flowchart illustrating other operations of the digital camera according to the first embodiment.

On the other hand, if it is determined that the image-size-setting operations are not performed at step S19 and if it is determined that the continuous-zoom-photographing frame 20 is currently produced at step S20, the flow returns to step On the other hand, if it is determined that the shutter button is pressed down at step S18, the flow proceeds to step S22 shown in FIG. 7 so that the AF processing is performed. At that time, the center part (focus point) of the continuous-zoom-photographing frame 20 is brought into focus automatically. Here, a contrast-detection system is used as a system used for performing the AF processing. Therefore, the focus lens is moved to a predetermined position where the image contrast becomes hardest on the center part of the continuous-zoom-photographing frame 20.

After performing the AF processing, still-image-photographing processing is performed for the subject at step S23 and image processing is performed for image data (photographed-image data) of the 3072×2304-dot (pixel) size, where the image data is obtained by the photographing processing. That is to say, thinning-out processing including simple thinning-out, interpolation thinning-out, and so forth is performed for the image data so that the size of the image data agrees with the currently set image size. Then, the image data is stored in the buffer memory. That is to say, when the currently set image size corresponds to 3072×2304 dots (pixels), the thinning-out processing is not performed. Here, the user presses down the shutter button and performs the still-image-photographing processing while a subject image, the continuous-zoom-photographing frame 20, and the focus frame are produced on the image display section 12 as shown in FIG. 3.

Next, the trimming-image data is generated from the obtained photographed-image data at step S24. More specifically, the trimming position information recorded onto the trimming-position-record area and the trimmed-image size corresponding to the currently set image size are read, the range of an image for trimming on the photographed image data stored in the buffer memory is specified by using the read trimming position and trimmed-image size, and the image data corresponding to the specified range is copied and stored in the buffer memory. Here, the pixel-interpolation processing may be performed for the copied image data so that the size of an image generated from the copied image data agrees with the currently set image size. Then, the copied image data may be stored in the buffer memory.

That is to say, in the case of an image of the photographed-image data obtained by the still-image-photographing processing as shown in FIG. 3, data on an image shown in the continuous-zoom-photographing frame 20a (hereinafter referred to as image data a) and data on an image shown in the continuous-zoom-photographing frame 20b (hereinafter referred to as image data b) are copied and stored in the buffer memory. Further, when the pixel-interpolation processing is performed, so as to obtain an image of which size agrees with the currently set image size, the pixel-interpolation processing is performed for the copied image data a and image data b. Then, the copied image data a and image data b are stored in the buffer memory. Since the image size is set to the 3072×2304-dot (pixel) size, the pixel-interpolation processing is performed so as to achieve the 3072×2304-dot (pixel) size. The trimmed-image data is generated irrespective of whether or not the continuous-zoom-photographing frame 20 is produced.

Next, it is determined whether or not image data that shall be stored, namely, the photographed-image data and the trimmed-image data corresponding two images (the copied image data a and image data b) are produced on the image-display section 12 as a review-display image. The above-described determination is made according to whether or not settings are made in advance, for example, in setting mode or the like, so that review display is performed.

If it is determined that the review display is performed at step S25, the image corresponding to the photographed-image data and the two images corresponding to the trimmed-image data, where the photographed-image data and the trimmed-image data are stored in the buffer memory, are produced on the image-display section 12 at step S26, and the flow proceeds to step S27. For producing the above-described data, the three images corresponding to the recorded image data may be produced one by one at predetermined time periods. Further, the produced image data may be changed at the time where the user operates the key-input section 13 or the three images corresponding to the above-described data may be produced at the same time.

On the other hand, if it is determined that the review display is not performed at step S25, the flow proceeds to step S27.

When the flow proceeds to step S27, the photographed-image data and the trimmed-image data corresponding to the two images that are stored in the buffer memory are compressed and stored in the flash memory 11.

Figure 8A:
FIGS. 8A to 8C show an image recorded by performing photographing processing in a continuous-zoom-photographing mode.
Figure 8B:
Figure 8C:

Each of FIGS. 8A to 8C show the image corresponding to the image data stored in the flash memory 11. FIG. 8A shows the image corresponding to the image data obtained by the still-image-photographing processing, FIG. 8B shows the image corresponding to the image data generated by the trimming processing, and FIG. 8C also shows the image corresponding to the image data generated by the trimming processing. The image data corresponding to the image shown in FIG. 8B is the image data corresponding to the image shown in the continuous-zoom-photographing frame 20a. Further, the image data corresponding to the image shown in FIG. 8C is the image data corresponding to the image shown in the continuous-zoom-photographing frame 20b.

Further, the currently set image size corresponds to 3072× 2304 dots (pixels) as described above. Therefore, in the case of the image data corresponding to the image shown in FIG. 8B, the viewing angle is determined so that the zoom magnification of 1.5× can be attained with reference to the viewing angle of the image corresponding to the photographed-image data. Namely, the image data on the image shown in FIG. 8B is the image data corresponding to 2048×1536 dots (pixels). Further, in the case of the image data on the image shown in FIG. 8C, the viewing angle is determined so that the zoom magnification of 1.92× can be attained with reference to the viewing angle of the image corresponding to the photographed-image data. Namely, the image data on the image shown in FIG. 8C is the image data corresponding to 1600× 1200 dots (pixels).

When a comparison of FIG. 3 and FIGS. 8A to 8C is made, it becomes clear that the entire image of FIG. 3 corresponds to the image of FIG. 8A, the image of the continuous-zoom-photographing frame 20a shown in FIG. 3 corresponds to the image of FIG. 8B, and the image of the continuous-zoom-photographing frame 20b shown in FIG. 3 corresponds to the image of FIG. 8C. That is to say, the data on three images with different zoom magnifications (viewing angles) can be obtained by performing a single photographing operation.

After storing the photographed-image data or the like in the flash memory 11, image production is started at step S28 so that only the through image of the subject and the focus frame are produced even though the continuous-zoom-photographing frame 20 is not produced. Then, the flow returns to step S10 as shown in FIG. 6.

Thus, in the continuous-zoom-photographing mode, the continuous-zoom-photographing frame 20 is produced and adjusted by operating the cross key so that the continuous-zoom-photographing frame 20 surrounds the subject the user wants to photograph. When the user presses down the shutter button, the still-image-photographing processing is performed, the image data corresponding to the image shown in the continuous-zoom-photographing frame 20a and the image data corresponding to the image shown in the continuous-zoom-photographing frame 20b are generated from the image data obtained through the still-image-photographing processing. Further, the image data obtained through the still-image-photographing processing and the image data corresponding to the two images obtained by the trimming processing are stored in the flash memory 11.

A-4. Advantages

Thus, according to the first embodiment, the continuous-zoom-photographing frame 20 is produced on the image display section 12. Therefore, the user can identify the range of an image for cutting by performing the trimming processing.

Further, the trimming position shown in the continuous-zoom-photographing frame 20 representing the size of a produced image for trimming can be adjusted by operating the cross key. Therefore, it becomes possible to adjust the continuous-zoom-photographing frame 20 so that the continuous-zoom-photographing frame 20 matches with a subject on which the user wants to zoom in. Subsequently, a zoomed image can be obtained.

Further, when the still-image-photographing processing is performed, data on the image shown in the continuous-zoom-photographing frame 20 is generated from the image data obtained through the photographing processing by performing the trimming processing, and the image data obtained by the photographing processing and the generated image data are stored in the flash memory 11. Subsequently, a plurality of images with different magnifications (viewing angles) can be obtained at one time.

Further, according to the first embodiment, the trimming position shown in the continuous-zoom-photographing frame 20 can be changed only when the continuous-zoom-photographing frame 20 is produced on the image display section 12. However, it may be configured that the trimming position shown in the continuous-zoom-photographing frame 20 can be changed even though the continuous-zoom-photographing frame 20 is not produced on the image display section 12.

Figure 13A:
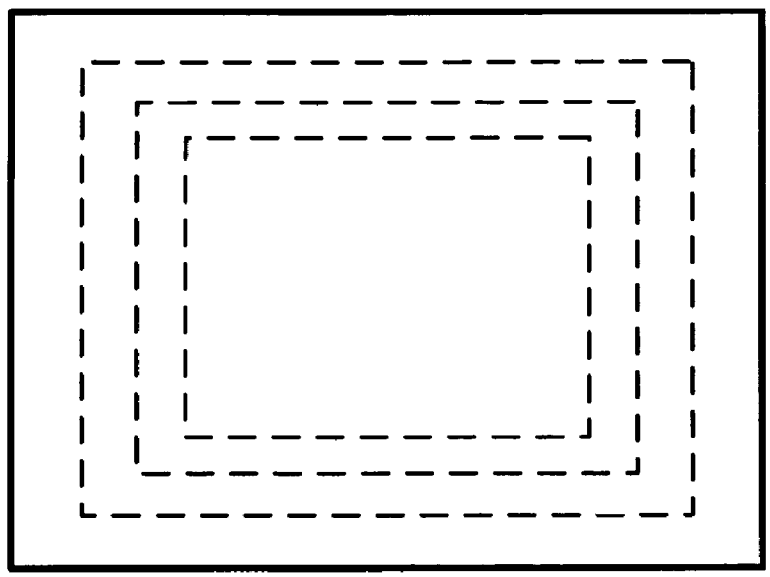
FIGS. 13A and 13B show the at least one continuous-zoom-photographing frame produced on the image-display section 12.
Figure 13B:
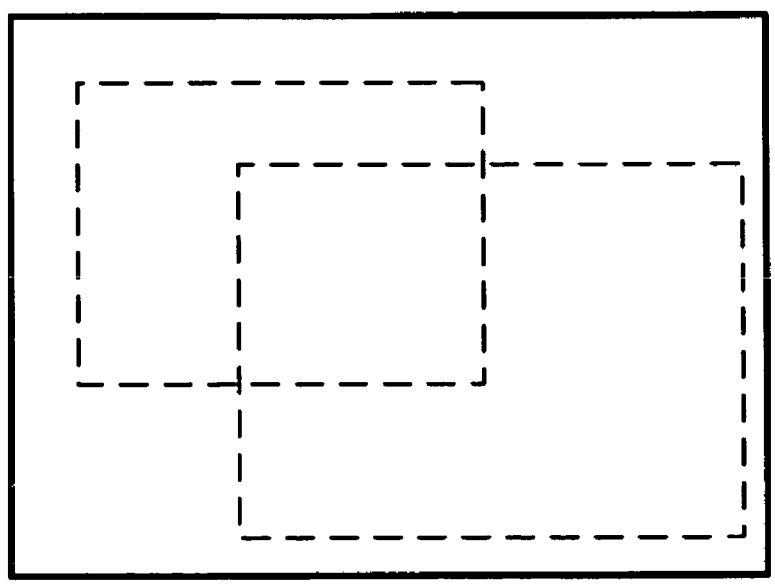

Further, even-though it is configured that the continuous-zoom-photographing frames 20a and 20b move as a single frame, each of the continuous-zoom-photographing frames 20a and 20b may be moved independently as shown in FIG. 13B. In that case, two focus points are provided.

B. Second Embodiment

Next, a second embodiment of the present invention will be described.

According to the first embodiment, the center of the continuous-zoom-photographing frame 20 corresponds to the focus point. However, according to the second embodiment, the position of the continuous-zoom-photographing frame 20 is determined on the basis of the focus-point position.

B-1. Operations of Digital Camera 1

According to the second embodiment, the image pickup device of the present invention is also achieved by using the digital camera 1 having the same configuration as that shown in FIG. 1. Hereinafter, operations of the digital camera 1 of the second embodiment will be described.

In the second embodiment, the same operations of the digital camera 1 as those in the first embodiment will not be described. The digital camera 1 of the second embodiment performs operations shown in a flowchart of FIG. 9 in place of the operations shown in the flowchart of FIG. 6.

First, if it is determined that the continuous-zoom-photographing mode is selected (branched off like a letter Y, at step S2 shown in FIG. 5), the flow proceeds to step S51 shown in FIG. 9 so that initial settings on the focus point (position) and the trimming position shown in the continuous-zoom-photographing frame 20 are made. According to the above-described initial settings, the focus point is provided at the center of a picked up image and information about the trimming position is recorded onto the trimming-position-record area of the memory 9, where the trimming position is determined so that the continuous-zoom-photographing frame 20 corresponds to the center part of the picked-up image. At that time, the focus point and the center of the continuous-zoom-photographing frame 20 are at the same position.

Next, at step S52, it is determined whether or not the currently set image size corresponds to 640×480 dots (pixels).

If it is determined that the currently set image size corresponds to 640×480 dots (pixels) at step S52, the digital camera 1 returns to the ordinary still-image-photographing mode, namely, step S2. If it is determined that the currently set image size does not correspond to 640×480 dots (pixels), the flow proceeds to step S53.

When the flow proceeds to step S53, information about the zoom magnification of the continuous-zoom-photographing frame 20 is acquired from the trimming-size table stored in the memory 9 on the basis of the currently set image size.

Next, at step S54, the continuous-zoom-photographing frame 20 is produced on the image display section 12 on the basis of the acquired information about the zoom magnification of the continuous-zoom-photographing frame 20 and the trimming-position information recorded onto the trimming-position-record area of the memory 9.

Next, it is determined whether or not the user operates the SET key at step S55.

If it is determined that the user operates the SET key at step S55, the flow proceeds to step S56 so that it is determined whether or not the continuous-zoom-photographing frame 20 is currently produced.

If it is determined that the continuous-zoom-photographing frame 20 is not produced at step S56, the flow proceeds to step S57 so that the continuous-zoom-photographing frame 20 is produced on the basis of the acquired information about the zoom-magnification of the continuous-zoom-photographing frame 20 and the trimming-position information recorded onto the trimming-position-record area. Then, the flow proceeds to step S59. If it is determined that the continuous-zoom-photographing frame 20 is produced at step S56, the flow proceeds to step S58 so that the production of the continuous-zoom-photographing frame 20 is stopped, and then proceeds to step S59.

On the other hand, if it is determined that the user does not operate the SET key at step S55, the flow proceeds to step S59.

When the flow proceeds to step S59, it is determined whether or not the user operates the cross key.

If it is determined that the cross key is not operated at step S59, the flow proceeds to the step S65. If it is determined that the cross key is operated, the flow proceeds to the step S60 so that a new focus point is designated according to the cross-key operation performed by the user. In that case, first, the center of the image produced on the image-display section 12 is designated as the focus point at step S51. When the user operates the part designated by the symbol "→" of the cross key, the designated focus point moves to the right. When the user operates the part designated by the symbol "←" of the cross key, the designated focus point moves to the left. Further, when the user operates the part designated by the symbol "↑" of the cross key, the designated focus point moves upward, and when user operates the part designated by the symbol "⇓" of the cross key, the designated focus point moves downward.

After the focus point is designated at step S60, the flow proceeds to step S61 so that the trimming position of the continuous-zoom-photographing frame 20 is calculated according to the designated focus point and information about the calculated trimming position is recorded onto the trimming-position-record area. That is to say, the trimming-position information recorded onto the trimming-position-record area is updated. The above-described function of updating the trimming position according to the focus position corresponds to a change unit of the present invention.

Here, the trimming position determined according to the designated focus point denotes the trimming position of the continuous-zoom-photographing frame 20, where the center of the continuous-zoom-photographing frame 20 produced on the image display section 12 corresponds to the designated focus point.

However, when the continuous-zoom-photographing frame 20 lies off a range defined by the viewing angle of a picked up image due to the designated focus point, the trimming position of the continuous-zoom-photographing frame 20 is recalculated so that the continuous-zoom-photographing frame 20 falls within the range defined by the viewing angle of the picked-up image.

Figures 10A, 10B:
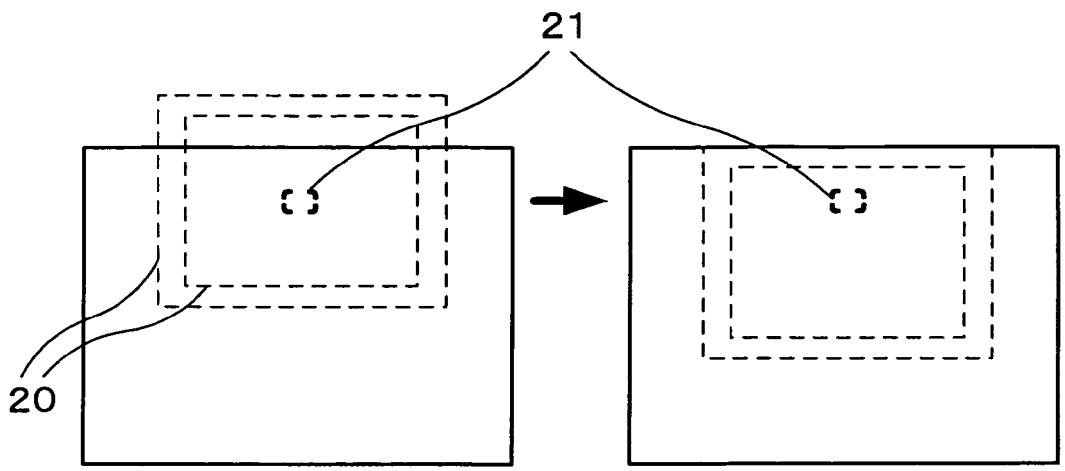
FIGS. 10A to 10F show at least one continuous-zoom-photographing frame produced on the image display section 12, where the continuous-zoom-photographing frame is indicated by a focus point.

For example, if an upper part of the continuous-zoom-photographing frame 20 lies off a range defined by the viewing angle of a picturized image due to a focus point shown in FIG. 10A, the continuous-zoom-photographing frame 20 is moved downward by as much as the upper part that lies off, as shown FIG. 10B, and information about the trimming position of the continuous-zoom-photographing frame 20 is recorded. A focus frame 21 denotes the currently used focus point.

Figures 10C, 10D:
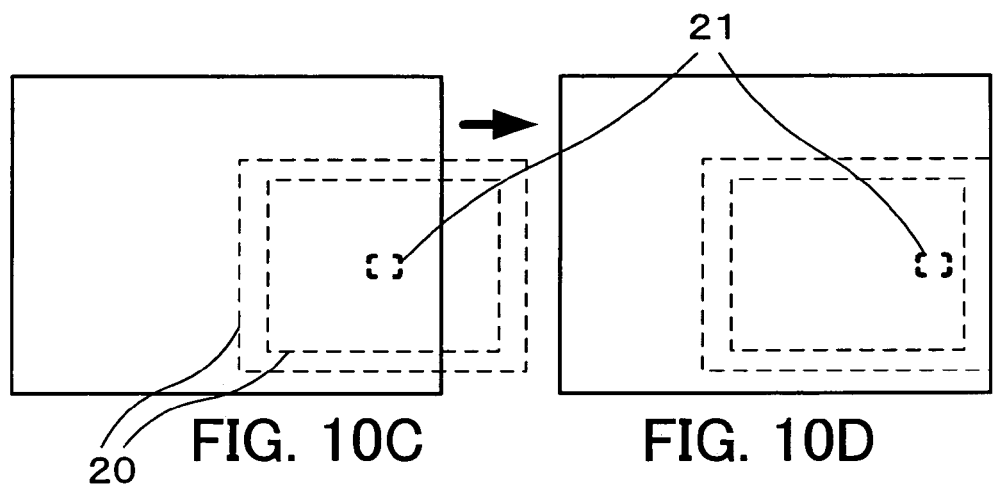

Further, if a right part of the continuous-zoom-photographing frame 20 lies off the range defined by the viewing angle of the picturized image due to a focus point shown in FIG. 10C, the continuous-zoom-photographing frame 20 is moved to the left by as much as the right part that lies off, as shown FIG. 10D, and information about the trimming position of the continuous-zoom-photographing frame 20 is recorded.

Figures 10E, 10F:
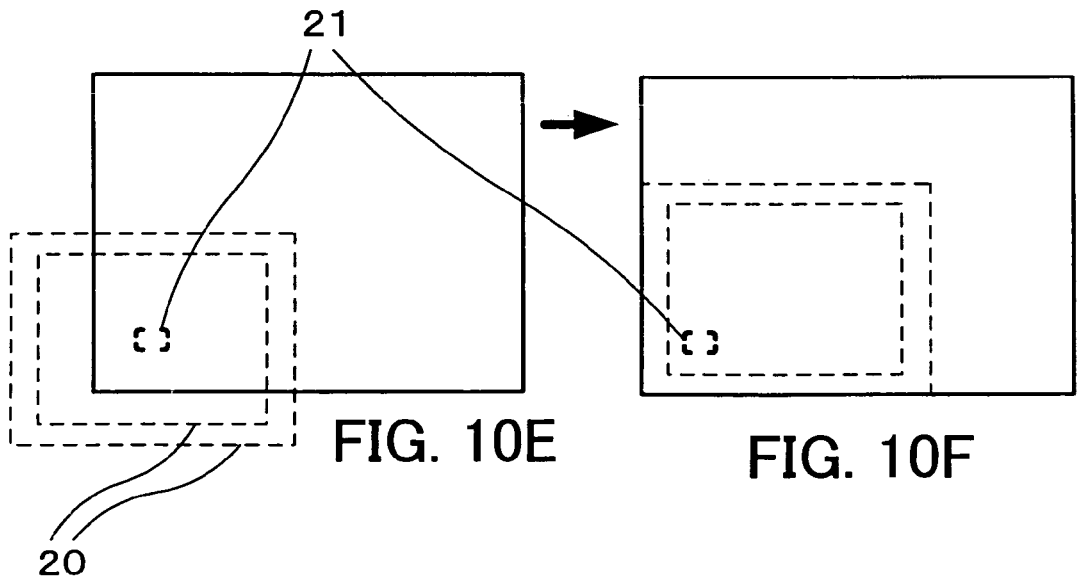

Further, if a left and lower part of the continuous-zoom-photographing frame 20 lies off the range defined by the viewing angle of the picturized image due to a focus point shown in FIG. 1E, the continuous-zoom-photographing frame 20 is moved to the right and upward by as much as the left and lower part that lies off, as shown FIG. 10F, and information about the trimming position of the continuous-zoom-photographing frame 20 is recorded.

When the recorded information about the trimming position determined according to a designated focus point is updated at step S61, the flow proceeds to step S62 so that it is determined whether or not the continuous-zoom-photographing frame 20 is currently produced.

If it is determined that the continuous-zoom-photographing frame 20 is produced at step S62, the flow proceeds to step S63 so that the continuous-zoom-photographing frame 20 is produced on the image-display section 12 on the basis of the information about the zoom magnification of the continuous-zoom-photographing frame 20, the zoom-magnification information having been acquired at step S53, and the new trimming-position information recorded onto the trimming-position-record area. Further, the focus frame 21 is produced at the focus point designated at step S60. Then, the flow proceeds to step S65.

On the other hand, if it is determined that the continuous-zoom-photographing frame 20 is not produced at step S62, the flow proceeds to step S64 so that the focus frame 21 is produced on the basis of the focus point designated at step S60, and the flow proceeds to step S65.

When the flow proceeds to step S65, it is determined whether or not the user presses down the shutter button. If it is determined that the shutter button is not pressed down, the flow proceeds to step S66 so that it is determined whether or not the user performs image-size-setting operations.

If it is determined that the image-size settings are made at step S66, the flow proceeds to step S67 so that it is determined whether or not the continuous-zoom-photographing frame 20 is currently produced.

If it is determined that the continuous-zoom-photographing frame 20 is not produced at step S67, the flow proceeds to step S68 so that the image-size settings are made according to the setting operations performed by the user. Then, the flow returns to step S52.

On the other hand, if it is determined that the user does not perform the image-size-setting operations at step S66 and if it is determined that the continuous-zoom-photographing frame 20 is currently produced at step S67, the flow returns to step S55.

On the other hand, if it is determined that the shutter button is pressed down at step S64, the flow proceeds to step S21. Since the processing performed thereafter is the same as that of the first embodiment, the description thereof is not provided. The photographed-image data and the trimmed-image data are stored at step S26 shown in FIG. 7 and the production only of the though image of the subject and the focus frame is started at step S27. Then, the flow returns to step S55 ad shown in FIG. 9.

B-2. Advantages

Thus, according to the second embodiment, the trimming position of the continuous-zoom-photographing frame 20 is determined according to the focus point. Therefore, it becomes possible to bring a subject the user wants to photograph into focus and obtain a plurality of correctly-focused images with different magnifications (viewing angles).

Further, if the continuous-zoom-photographing frame 20 lies off a range defined by the viewing angle of a picturized image due to a designated focus point, the trimming position of the continuous-zoom-photographing frame 20 is adjusted so that the continuous-zoom-photographing frame 20 falls within the range defined by the viewing angle of the picturized image. Therefore, it becomes possible to obtain the data on a fine trimmed image having no white space (an area showing no subject).

Although the continuous-zoom-photographing frame 20 is produced in the second embodiment, only the focus frame 21 may be produced. Namely, the continuous-zoom-photographing frame 20 may not be produced.

C. Example Modifications

The first and second embodiments may be modified as below.

In the first and second embodiments, each of the image data obtained through the still-image-photographing processing and the trimmed-image data generated from the image data obtained through the still-image-photographing processing is recorded as a single image-data item. However, according to a third embodiment of the present invention, a single group-image-data item is generated on the basis of the image data obtained through the still-image-photographing processing and the generated trimmed-image data. Then, the single group-image-data item is recorded.

Figure 11:
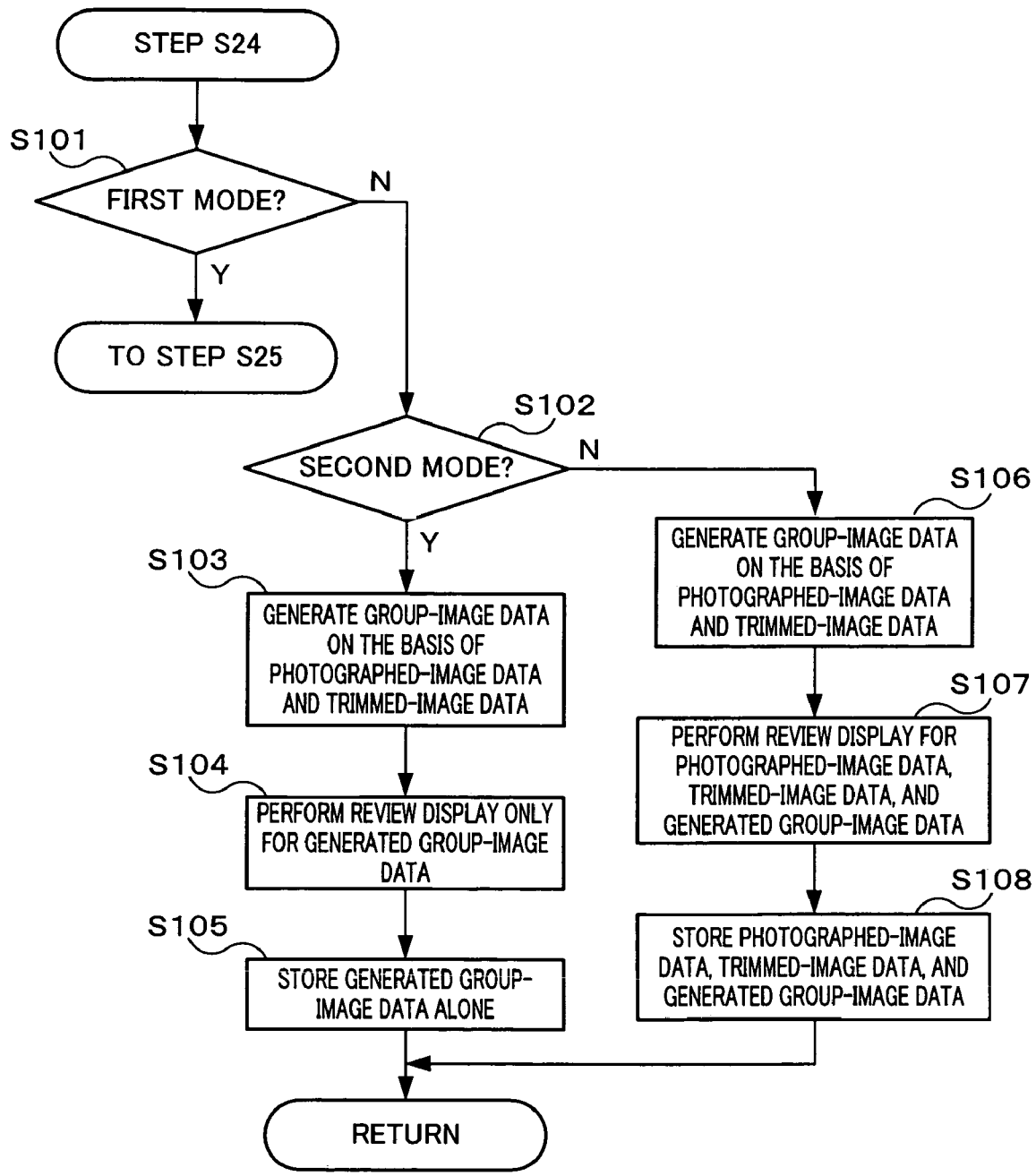
FIG. 11 is a flowchart illustrating operations of an example modified digital camera.

The third embodiment will be described in detail with reference to a flowchart shown in FIG. 11. First, in setting mode, the user selects any one of first mode, second mode, and third mode by operating the key-input section 13. Then, the trimmed-image data is generated on the basis of the image data obtained through the photographing processing at step S24 shown in FIG. 7. Subsequently, the flow proceeds to step S101 so as to determine whether or not the user selects the first mode.

If it is determined that the first mode is selected at step S101, the flow proceeds to step S25 as shown in FIG. 7. If it is determined that the first mode is not selected, the flow proceeds to step S102 so as to determine whether or not the user selects the second mode.

Figure 12:
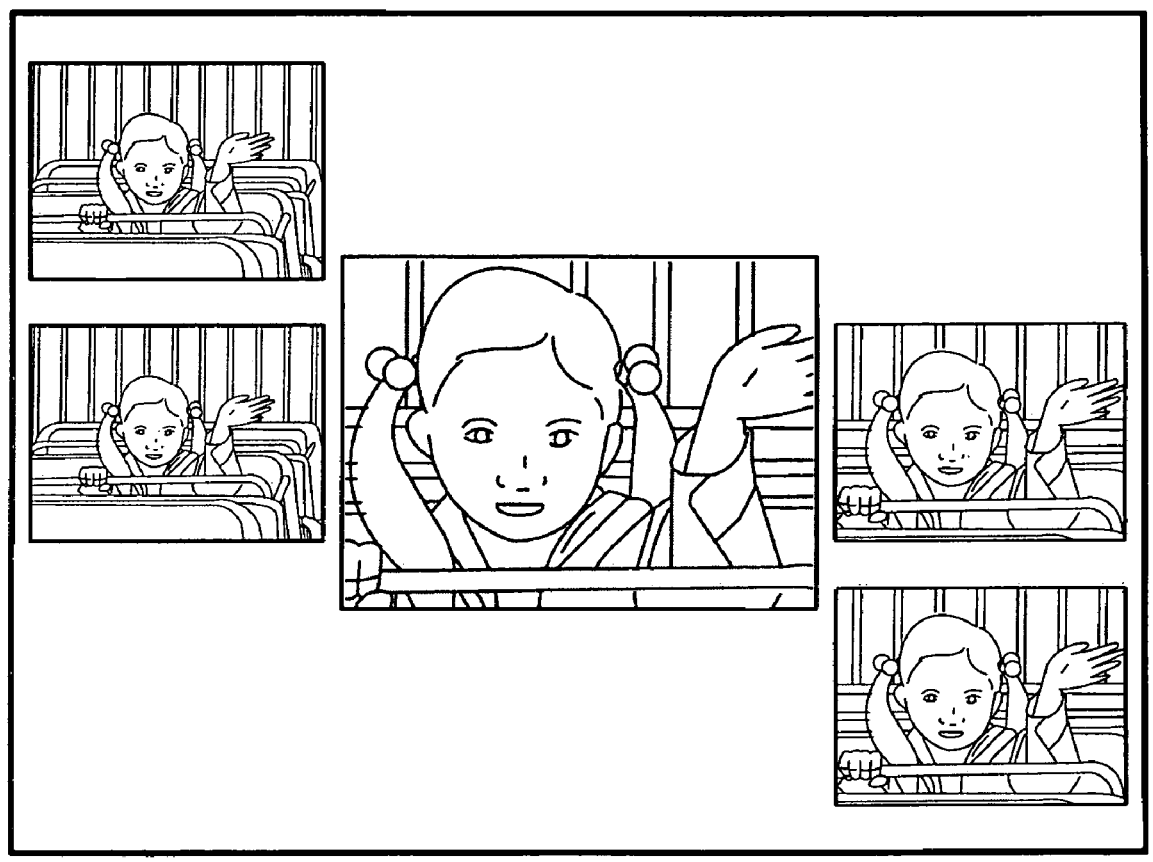
FIG. 12 shows the images corresponding to generated group-image data.

If it is determined that the second mode is selected at step S102, the flow proceeds to step S103 so that the image data obtained through the photographing processing and the trimmed-image data generated through the trimming processing are grouped, where the trimmed-image data corresponds to two images. Subsequently, the group-image data corresponding to a single image is generated as shown in FIG. 12. The image corresponding to the group-image data is not limited to an example image shown in FIG. 12 but can be presented as an image referred to as a picture-in-picture image.

Next, the flow proceeds to step S104 so that only the image corresponding to the generated group-image data is shown as a review-display image and only the generated group-image data is stored in the flash memory 11 at step S105.

On the other hand, if it is determined that the second mode is not selected at step S102, it is determined that the user selects the third mode and the flow proceeds to step S106 so that the image data obtained through the photographing processing and the trimmed-image data that is generated through the trimming processing and that corresponds to the two images are grouped. Subsequently, the group-image data corresponding to a single image is generated.

Next, the image data obtained through the photographing processing (photographed-image data), the trimmed-image data generated through the trimming processing, and the generated group-image data are produced on the image display section 12 as a review-display image at step S107. For producing the review-display image, the images corresponding to the photographed-image data, the trimmed-image data, and the group-image data may be produced one by one at predetermined time periods, or the image corresponding to the image data to be produced may be changed when the user operates the key-input section 13, or the images corresponding to the photographed-image data, the trimmed-image data, and the group-image data may be produced at the same time.

Next, the photographed-image data obtained through the photographing processing, the trimmed-image data corresponding to the two images, and the group-image data are stored in the flash memory 11 at step S108.

D. Effect

Thus, according to the above-described example modifications, the group-image data corresponding to a single image is generated on the basis of image data obtained through photographing processing and image data generated through trimming processing. Therefore, it becomes possible to enjoy an overhead view showing the background and circumstances surrounding a subject and a tight close-up at the same time. Further, the single image can be enjoyed as a fashionable photograph.

Further, group-image-generation mode may be provided. In that case, the photographed-image data and the image data generated on the basis of the photographed-image data by performing the trimming processing, where the trimmed-image data corresponds to two images, are stored in association with each other at step S27 as shown in FIG. 7.

Then, in the group-image-generation mode, one of the images corresponding to the photographed-image data and/or the image data generated through the trimming processing may be selected, the new group-image data corresponding to a single image may be generated from the photographed-image data stored in association with the selected image data, for example, and the generated group-image data may be stored in the flash memory 11.

Further, the first, second, and third modes may not be provided. Namely, it may be configured that the same processing as that performed in the above-described second mode is performed forcefully when the continuous-zoom-photographing mode is selected. Further, it may be configured that the same processing as that performed in the above-described third mode is performed forcefully.

Further, according to each of the embodiments, the two continuous-zoom-photographing frames 20a and 20b are produced. However, the number of the continuous-zoom-photographing frame may be one, or three or more as shown in FIG. 13A.

Further, information about the number of trimmed images to be generated is automatically acquired from the trimming-size table on the basis of the currently-set image size. However, it may be configured that the user can arbitrarily determine the number of images of the image data generated through the trimming processing. In that case, a predetermined number of continuous-zoom-photographing frames of different sizes are produced, where the predetermined number corresponding to the image number of the image data generated through the trimming processing is determined by the user.

Further, although the fixed trimming-size table is used, the size (zoom magnification) and/or number of an image for trimming may be arbitrarily set for each image size. That is to say, it may be configured that the user can change the details on the trimming-size table.

Further, the number of images for trimming is not changed irrespective of which image size is set. However, the number of images for trimming may be changed according to the image size. For example, it may be configured that the number of images for trimming increases every time the set image size increases.

Further, the size information of an image for trimming and the zoom-magnification information are automatically acquired from the trimming-size table on the basis of the currently set image size. However, it may be configured that the user can arbitrarily select the size and/or the zoom magnification of an image for trimming. In that case, when the user selects the zoom magnification, the size of the image for trimming corresponding to the selected zoom magnification is automatically determined. When the user selects the size of the image for trimming, the zoom magnification corresponding to the size of the image for trimming is automatically determined. This is because if the user can select each of the size of the image for trimming and the zoom magnification separately, the viewing angle of an image shown in the continuous-zoom-photographing frame produced on the image-display section 12 becomes different from that of an image which is actually generated. In that case, a continuous-zoom-photographing frame of the size corresponding to the zoom magnification designated by the user is produced and trimmed-image data is generated and recorded, where the size of an image generated from the trimmed-image data is designated by the user.

Further, an electronic-zoom (digital zoom) function may be provided, so as to zoom in on a subject the user wants to photograph by using the electronic-zoom function and generate data on an image shown in the continuous-zoom-photographing frame by performing trimming processing on the basis of the image data obtained through the electronic zooming. Since the subject image obtained through the electronic zooming can also be used as image data generated through the trimming processing, image data recorded through photographing processing denotes image data generated through the trimming processing. In that case, the size (zoom magnification) and/or number of images for trimming are set according to the electronic-zoom magnification. Further, in that case, the image data subjected to the electronic zooming is recorded after being subjected to pixel-interpolation processing so that the size of the image corresponding to the image data agrees with the currently set image size. Still further, the trimmed-image data obtained by performing trimming processing for the image data obtained through the electronic zooming is recorded, as it is, without being subjected to pixel-interpolation processing. Otherwise, the trimmed-image data is recorded after being subjected to the pixel-interpolation processing so that the size of the image corresponding to the trimmed-image data agrees with the currently set image size.

The trimming-size table stores information about the size and zoom magnification of an image for trimming in advance. However, the trimming-size table may store either the size information or the zoom-magnification information. If the trimming-size table stores the size information alone, the zoom magnification is calculated on the basis of the size of an image for setting and the image-for-trimming size corresponding to the image-for-setting size. Further, if the trimming-size table stores the zoom-magnification information alone, the image-for-trimming size is calculated on the basis of the image-for-setting size and the zoom magnification corresponding thereto.

Further, even though the photographed-image data, the trimmed-image data, and the group-image data are stored in the flash memory 11 as they are, it may be configured that image data the user wants to record is selected from among the image data stored in the buffer memory 11 and only the selected image data is stored in the flash memory 11 or the like.

Further, without being limited to the above-described embodiments, the above-described digital camera may be a mobile phone with a camera, a personal digital assistant (PDA) with a camera, a personal computer with a camera, an integrated-circuit (IC) recorder with a camera, a digital-video camera, and so forth. Namely, it is essential only that the digital camera 1 can photograph a subject.

An imaging program for an image pickup device in one embodiment of the present invention is stored to a memory (e.g., ROM, etc.) of the image pickup device. However, the imaging program should be also protected when this imaging program is stored to a memory medium and only the program is manufactured, sold, etc. In a protecting mode of this case, the program is protected in the mode of the recording medium storing the imaging program.

While the present invention has been described with reference to the preferred embodiments, it is intended that the invention be not limited by any of the details of the description therein but includes all the embodiments which fall within the scope of the appended claims.

What is claimed is:

1. An image pickup device comprising:
   image pickup means for performing still-image photographing of a subject;
   record means for recording image data;
   photograph control means for controlling the image pickup means to perform the still-image photographing of the subject;
   generation means for automatically generating trimmed-image data from photographed-image data obtained by the photograph control means before the photographed-image data is recorded on the record means;
   record control means for recording the photographed-image data obtained by the photograph control means and the trimmed-image data generated by the generation means on the record means;
   display control means for making display means produce a through image of the subject, wherein the through image is imaged by the image pickup means, and wherein the display control means makes the display means produce at least one trimming-range frame which shows a range of at least one image for which the generation means generates the trimmed-image data;
   set means for setting the size of at least one image to be obtained by the photograph control means; and
   correspondence-table-record means for recording the image size and at least one of a size and a number of the at least one trimming-range frame, so that the image size and the at least one of the frame size and the frame number are associated with each other;
wherein the display control means makes the display means produce the at least one trimming-range frame such that the size and/or number of the at least one trimming-range frame agrees with the frame size and/or the frame number that is recorded by the correspondence-table-record means in association with the image size set by the set means.

2. The image pickup device according to claim 1, further comprising instruction means for generating an instruction to photograph the subject, wherein the instruction means is operated by a user,
wherein when a photograph instruction is issued from the instruction means, the photograph control means controls the image pickup means that performs the still-image photographing for the subject.

3. The image pickup device according to claim 1, wherein the generation means generates the trimmed-image data corresponding to at least two images with different trimming ranges on the basis of the photographed-image data.

4. The image pickup device according to claim 3, wherein the record control means records the trimmed-image data corresponding to the at least two images with different trimming ranges onto the record means.

5. The image pickup device according to claim 1, further comprising group-image-generation means for generating group-image data corresponding to a single image by grouping the photographed-image data and the trimmed-image data,
wherein the record control means includes first record control means for recording the group-image data onto the record means.

6. The image pickup device according to claim 1, wherein the record control means records each of the photographed-image data and the trimmed-image data onto the record means as independent image data.

7. The image pickup device according to claim 1, further comprising:
group-image-generation means for generating group-image data corresponding to a single image by grouping the photographed-image data and the trimmed-image data; and
record-mode-selection means which selects at least one predetermined record mode from among various types of record modes,
wherein the record control means includes:
first record control means for recording the group-image data onto the record means; and
second record control means for recording each of the photographed-image data and the trimmed-image data onto the record means as independent image data,
wherein at least one or both of the first record control means and the second record control means perform record control according to the record mode selected by the record-mode-selection means.

8. The image pickup device according to claim 1, further comprising photograph-review-display control means for producing predetermined image data recorded onto the record means by the record control means on display means as at least one review-display image.

9. The image pickup device according to claim 1, wherein the number of the at least one trimming-range frame corresponds to the number of the at least one image for which the generation means generates the trimming-image data.

10. The image pickup device according to claim 1, further comprising change means for changing at least one trimming position of the at least one trimming-range frame produced on the display means, wherein the change means is operated by a user,
wherein the display control means makes the display means produce the at least one trimming-range frame at the changed trimming position.

11. The image pickup device according to claim 10, further comprising trimming-position-record control means for functioning as a last memory configured to store information about the changed trimming position when the change means changes the trimming position,
wherein the display control means displays at least one trimming-range frame according to the trimming-position information memorized as the last memory by the trimming-position-record control means.

12. The image pickup device according to claim 1, further comprising focus control means which brings the subject into focus automatically,
wherein the focus control means brings the center of the trimming-range frame into focus automatically.

13. The image pickup device according to claim 1, further comprising focus control means for bringing the subject into focus automatically,
wherein the display control means makes the display means produce the at least one trimming-range frame so that at least one focus point which is brought into focus automatically by the focus control means agrees with the center of the at least one trimming-range frame.

14. The image pickup device according to claim 13, further comprising specification means for specifying at least one focus point which is brought into focus automatically by the focus control means, wherein the specification means is operated by a user,
wherein when the focus point is specified by the specification means, the display control means makes the display means produce the at least one trimming-range frame so that the specified focus point agrees with the center of the at least one trimming-range frame.

15. The image pickup device according to claim 13, wherein when the at least one trimming-range frame produced on the display means lies off a range corresponding to a viewing angle of the subject image picked up by the image pickup means, the display control means makes the display means produce the at least one trimming-range frame so that the at least one trimming-range frame fits into the viewing-angle range.

16. The image pickup device according to claim 1, further comprising switch means for switching between an on state in which the display control means makes the display means produce the at least one trimming-range frame and an off state in which the display control means does not make the display means produce the at least one trimming-range frame, wherein the switch means is operated by a user,
wherein when the switch means switches to the on state, the display control means makes the display means produce the trimming-range frame, and
wherein when the switch means switches to the off state, the display control means does not make the display means produce the trimming-range frame.

17. The image pickup device according to claim 1, wherein the record means includes:
first record means for recording image data; and
second record means for recording image data,
wherein the record control means includes:
first record control means for recording the photographed-image data and the trimmed-image data onto the first record means;

selection means for selecting either the photographed-image data or the trimmed-image data recorded onto the first record means; and second record control means for recording the selected image data onto the second record means.

18. The image pickup device according to claim 1, wherein the record control means records photographed-image data before trimming by said generation means and the trimmed-image data generated by the generation means on the record means such that a plurality of image data having different viewing angles is acquired by the image pickup device in a single photographing operation.

19. An image pickup device comprising:

image pickup means for performing still-image photographing of a subject;

record means for recording image data;

photograph control means for controlling the image pickup means to perform the still-image photographing of the subject;

generation means for automatically generating trimmed-image data from photographed-image data obtained by the photograph control means before the photographed-image data is recorded on the record means;

record control means for recording the photographed-image data obtained by the photograph control means and the trimmed-image data generated by the generation means on the record means;

set means for setting the size of at least one image to be obtained by the photograph control means; and correspondence-table-record means for recording the image size and at least one of a range and a number of at least one trimmed image to be obtained by generating the trimmed-image data, so that the image size and the at least one of the range and the number of the at least one trimmed image are associated with each other, wherein the generation means generates the trimmed-image data from which the at least one trimmed image is generated such that the range and/or number of the at least one trimmed image agrees with the range and/or the number recorded by the correspondence-table-record means in association with the image size set by the set means.

20. The image pickup device according to claim 19, further comprising change means for changing at least one trimming position, wherein the change means is operated by a user, wherein the generation means generates the trimmed-image data from which the at least one trimmed image is generated such that the trimmed image is produced at the changed trimming position.

21. The image pickup device according to claim 20, further comprising trimming-position-record control means for functioning as a last memory configured to store information about the changed trimming position when the trimming position is changed by the change means, wherein the generation means generates the trimmed-image data from which the at least one trimmed image is generated such that the trimmed image is produced according to the trimming position information memorized as the last memory by the trimming-position-record control means.

22. The image pickup device according to claim 19, further comprising:

focus control means for bringing the subject into focus automatically; and change means for changing at least one trimming position according to at least one focus point which is brought into focus automatically by the focus control means, wherein the generation means generates the trimmed-image data from which the at least one trimmed image is generated such that the trimmed image is produced at the changed trimming position.

23. The image pickup device according to claim 19, further comprising:

determination means for determining whether or not the image size set by the set means is a predetermined image size; and prohibition control means for prohibiting the trimmed-image-data generation performed by the generation means when the determination means determines that the set image size is the predetermined image size.

24. The image pickup device according to claim 19, wherein the record control means records photographed-image data before trimming by said generation means and the trimmed-image data generated by the generation means on the record means such that a plurality of image data having different viewing angles is acquired by the image pickup device in a single photographing operation.

25. A computer-readable recording medium having stored thereon a computer program for an imaging device, wherein the imaging device comprises image pickup means for performing still-image photographing of a subject, said program controlling the imaging device to perform functions of:

displaying, on a display, a through image of the subject, wherein the through image is imaged by the image pickup means;

setting an image size of at least one image to be obtained;

determining, based on the set image size, a size and/or a number of at least one trimming-range frame to be displayed from a correspondence table, wherein the correspondence table records the image size and at least one of the size and the number of the at least one trimming-range frame, so that the image size and the at least one of the size and the number of the at least one trimming-range frame are associated with each other;

displaying, on the display, the at least one trimming-range frame in the determined size and/or number;

obtaining photographed-image data of the subject;

automatically generating trimmed-image data from the obtained photographed-image data before the photographed image data is recorded on a recording medium, wherein the displayed at least one trimming-range frame shows a range of at least one image for which the trimmed-image data is generated; and recording the obtained photographed-image data and the generated trimmed-image data on the recording medium.

26. A computer-readable recording medium having stored thereon a computer program for an imaging device, wherein the imaging device comprises image pickup means for performing still-image photographing of a subject, said program controlling the imaging device to perform functions of:

setting an image size of at least one image to be obtained;

determining from a correspondence table, based on the set image size, a range and/or a number of at least one trimmed image to be obtained by generating trimmed-image data, wherein the correspondence table records the image size and at least one of the range and the number of the at least one trimmed image, so that the image size and the at least one of the range and the number of the at least one trimmed image are associated with each other;

obtaining photographed-image data of the subject;

automatically generating the trimmed-image data from the obtained photographed-image data before the photographed image data is recorded on a recording medium, wherein the trimmed-image data is generated such that the range and/or number of the at least one trimmed image agrees with the determined range and/or number; and recording the obtained photographed-image data and the generated trimmed-image data on the recording medium.

* * * * *